(12) United States Patent
Iwamoto

(10) Patent No.: US 6,233,406 B1
(45) Date of Patent: May 15, 2001

(54) CAMERA HAVING FILM WINDING APPARATUS

(75) Inventor: Shigeru Iwamoto, Saitama (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/443,390

(22) Filed: Nov. 19, 1999

(30) Foreign Application Priority Data

Nov. 25, 1998 (JP) .................................................. 10-334628

(51) Int. Cl.$^7$ ........................................................ G03B 1/00
(52) U.S. Cl. .......................... 396/284; 396/302; 396/396; 396/407
(58) Field of Search ..................................... 396/396, 395, 396/406, 284, 409, 301, 302, 397

(56) References Cited

U.S. PATENT DOCUMENTS

| | | | |
|---|---|---|---|
| 4,084,169 | * 4/1978 | Iwata et al. ............................. | 396/395 |
| 4,174,888 | * 11/1979 | Hunn et al. ............................ | 396/284 |
| 4,885,599 | 12/1989 | Goto et al. ............................. | 396/407 |
| 5,903,784 | 5/1999 | Hori ....................................... | 396/277 |
| 6,126,333 | * 10/2000 | Hori ................................. | 396/396 X |

FOREIGN PATENT DOCUMENTS

| | | |
|---|---|---|
| 10-20375 | 1/1998 | (JP) . |
| 19728982 | 1/1998 | (DE) . |

\* cited by examiner

*Primary Examiner*—W. B. Perkey
(74) *Attorney, Agent, or Firm*—Greenblum & Bernstein, P.L.C.

(57) ABSTRACT

A camera having a manual film winding apparatus in which a film is wound in association with a rotation of a winding operation device from a wind start position to a wind end position includes: an encoder which rotates in association with the movement of the film which is wound by the rotation of the winding operation device and generates a signal each time the winding operation device is rotated by a predetermined angle; a film feed amount detection device which counts output of the encoder to detect the feed amount of the film; a rotation detection device for detecting the rotation of the winding operation device; and a controller which interrupts the encoder by turning the encoder OFF after the lapse of a predetermined time when the winding operation device is stopped during the winding operation, wherein the controller turns the encoder ON when the rotation detection device detects rotation of the winding operation device thereafter, so that the film feed amount detection device continues the counting operation.

14 Claims, 25 Drawing Sheets

After Release of 2nd Frame

Wind Lever Released during Winding of 3rd Frame

➡ Flash ON-and-OFF

3rd Frame Winding Completed

CAMERA HAVING FILM WINDING APPARATUS

BACKGROUND OF THE INVENTION

1. Field of the Invention

The present invention relates to a camera having a manual winding device in which a film can be manually wound.

2. Description of the Related Art

In a known manual film winding device in which a film is wound by one frame by rotating a wind lever, a ratchet mechanism is provided which prevents the wind lever from being returned to the initial position without rotating the wind lever to a wind end extremity.

In a camera having such a film winding device, it is known to provide a film feed amount detection device which counts outputs of a photo-interrupter having a roller which comes into contact with the film to rotate therewith and a code plate which is rotated in association with the roller in order to measure the amount of the film to be fed. In this type of camera, even if the wind lever is released during the winding operation, the power supply to the photo-interrupter continues during the counting operation of the pulses, thus resulting in an increase in the power consumption. However, if the power supply to the photo-interrupter is stopped after the lapse of a predetermined time, it is then impossible to count the pulses in order to detect the film feed amount when the winding operation device is re-started.

SUMMARY OF THE INVENTION

It is an object of the present invention to provide a camera having a film winding apparatus in which the feed amount of the film which is manually wound by a winding operation device is detected, so that the film can be precisely fed by a constant amount, wherein if the winding operation device is released during the winding operation, the power supply is reduced to save the power, and if the winding operation device is re-operated to wind the film, a constant amount of film can be reliably fed.

In order to achieve the above-mentioned object, a camera is provided having a manual film winding apparatus in which a film is wound in association with a rotation of a winding operation device from a wind start position to a wind end position, including an encoder which rotates in association with the movement of the film which is wound by the rotation of the winding operation device and generates a signal each time the winding operation device is rotated by a predetermined angle; a film feed amount detection device which counts output of the encoder to detect the feed amount of the film; a rotation detection device for detecting the rotation of the winding operation device; and a controller which interrupts the encoder by turning the encoder OFF after the lapse of a predetermined time when the winding operation device is stopped during the winding operation, wherein the controller turns the encoder ON when the rotation detection device detects rotation of the winding operation device thereafter, so that the film feed amount detection device continues the counting operation.

Preferably, the encoder is a photo-interrupter.

An indication device can be included, wherein the controller causes the indication device to indicate a warning indication after the lapse of the predetermined time.

Alternatively, an acoustic alarm device can be included, wherein the controller causes the acoustic alarm device to generate an alarm sound after the lapse of the predetermined time.

Preferably, the controller actuates the indication device in different modes depending on the lapse time from the stoppage of the winding operation device.

Preferably, the controller actuates the acoustic alarm device in different modes depending on the lapse time from the stoppage of the winding operation device.

Alternatively, an indication device and an acoustic alarm device is included wherein the controller causes the indication device to indicate a warning indication after the lapse of a first predetermined time, and causes the acoustic alarm device to generate an alarm sound after the lapse of a second predetermined time longer than the first predetermined time.

Preferably, the photo-interrupter includes a roller which comes into contact with the film and rotates in association with the feed of the film, and a encoder plate which is rotated in association with the roller, the encoder plate being adapted to generate a signal each time the encoder plate rotates by a predetermined angle, so that the signals can be counted by the film feed amount detection device.

Preferably, the winding operation device includes a wind lever which can be rotated from the wind start position to the wind end position; and a spool which rotates in association with the rotation of the wind lever from the wind start position to the wind end position, wherein the film is wound via the rotation of the spool.

Preferably, a ratchet mechanism is also provided which stops stepwise the reverse rotation of the wind lever toward the wind start position during the rotation of the winding operation device from the wind start position toward the wind end position; wherein the rotation detection device is included of an intermediate position detection switch which detects when the winding operation device has moved from an engagement position with the ratchet mechanism to another engagement position.

Preferably, the controller detects the amount of film that is wound via an output of a photo-interrupter having a roller which comes into contact with the film and is rotated in association with the movement of the film and an encoder plate which is rotated in association with the roller. The camera includes a friction clutch which connects or disconnects the wind lever to, or from, the spool; and a film wind stop device which stops the rotation of the spool when the film feed amount detector detects that a predetermined amount of film is wound, wherein the friction clutch disconnects the wind lever from the spool so that the wind lever can be rotated to the wind end position without winding the film any further.

Preferably, a preliminary angle switch is also provided, wherein when the preliminary angle switch detects that the wind lever has been rotated past a preliminary angle toward the wind end position, the controller supplying electric power to the encoder; wherein when the wind lever has been rotated past the wind start position and before reaching the wind end position, the controller interrupts the encoder by turning the encoder OFF after the lapse of a predetermined time.

Preferably, the controller stops the indication warning of the indication device when the rotation detection device detects rotation of the winding operation device during the indication warning.

Preferably, the controller stops the alarm sound of the acoustic alarm device when the rotation detection device detects rotation of the winding operation device during the alarm sound.

The present disclosure relates to subject matter contained in Japanese Patent Application No.10-334628 (filed on Nov.

25, 1998) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENTS

Figure 1:
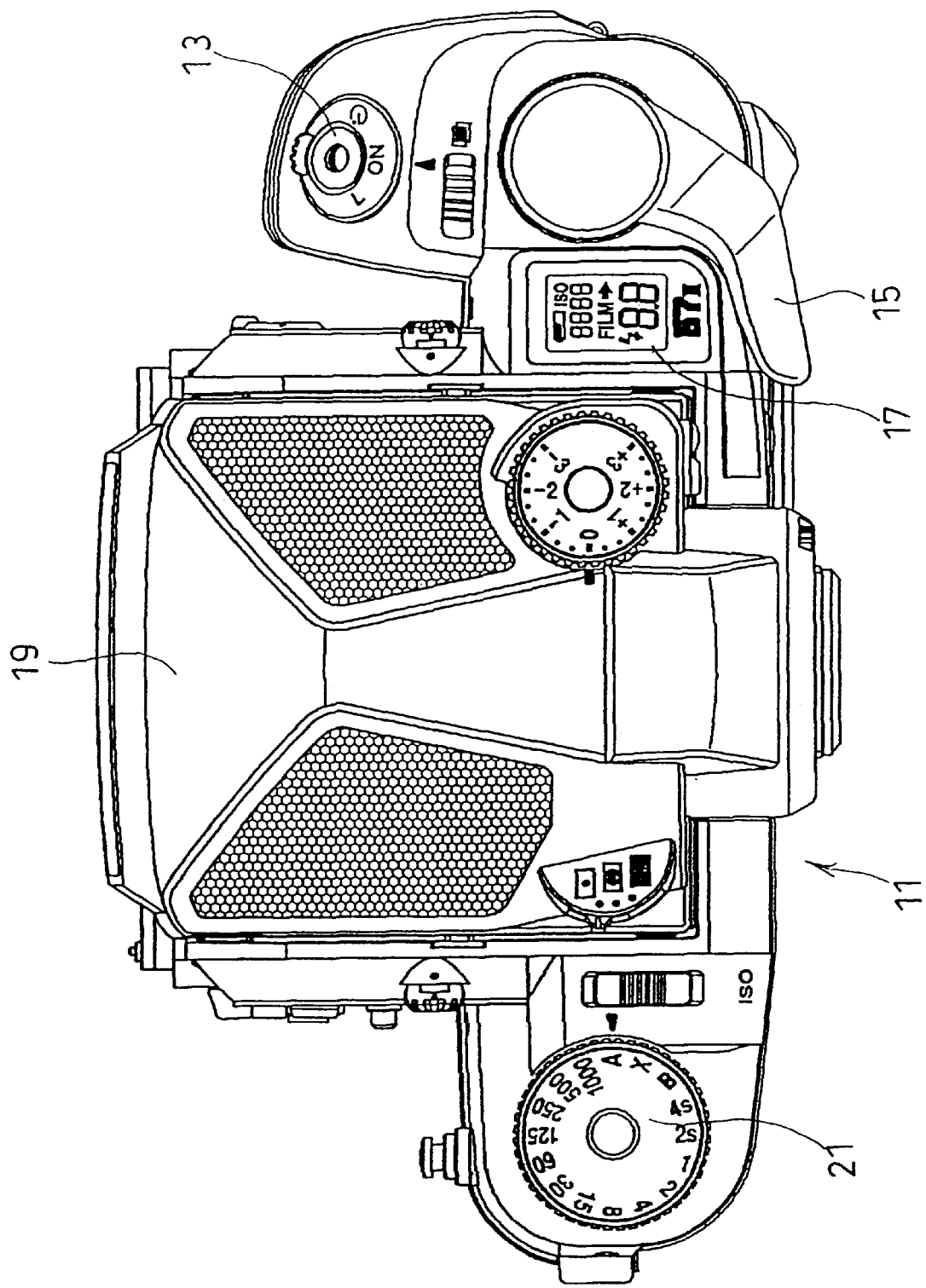
FIG. 1 is a plan view of a camera body showing an outer appearance of a single lens reflex camera for a Brownie film, to which an embodiment of the present invention is applied.

FIG. 1 shows a plan view of a medium-format single lens reflex camera to which the present invention is applied. A film winding apparatus of the camera includes a wind lever 15, a ratchet mechanism (ratchet device) 200 which is adapted to hold the wind lever 15 at an optional intermediate wind position if the user releases the wind lever 15 during the manual winding operation, a film wind driving mechanism 300 which operates in association with the rotation (winding operation) of the wind lever 15, a film wind stop device 600 which stops the feed of a film when a predetermined amount (length) of film is fed in the wind direction regardless of the film winding operation of the wind lever 15, and a double winding prevention mechanism 700 which prevents a double winding (multi-winding) of the film. In addition, a shutter charging motor 81 which is driven when the wind lever 15 is rotated to wind the film, a shutter charge drive mechanism which is driven by the shutter charging motor 81, and a mirror charging mechanism are also provided; however, no detailed explanation thereof will be given herein. The single lens reflex camera is also provided with springs which drive leading and trailing curtains (not shown) as a shutter device.

As is well known in the art, the wind lever 15 has play (preliminary angular-motion range) between a photographable or exposure position (accommodated position) close to the outer surface of the camera body 11 and a wind start position. If the wind lever 15 is rotated in the wind direction over the preliminary angle, i.e., if the rotation of the wind lever 15 from the wind start position to a wind end position occurs, the film is wound by the film wind drive mechanism 300 and the shutter charging motor 81 is driven to move the leading and trailing curtains to a release stand-by position in which the leading and trailing curtain drive springs are charged.

The wind lever 15 is prevented from being reversed toward the wind start position by the ratchet mechanism 200 during the movement of the wind lever 15 from the wind start position to the wind end position. When the wind lever 15 is rotated to the wind end position, the engagement thereof with the ratchet mechanism 200 is released, so that the wind lever 15 can be returned to the photographable position. When the wind lever 15 is rotated to the wind end position and is thereafter returned to a position between the preliminary angle and the photographable position, the multi-wind prevention mechanism 700 prevents the wind lever 15 from being rotated beyond the preliminary angle via the wind lock mechanism.

The camera body 11 is provided on the upper surface thereof with a release button 13 in front of the wind lever 15 (i.e., closer to an object to be taken); an external LCD (indication device) 17 in which photographing data is displayed, between the wind lever 15 and a pentagonal prism unit 19; and a shutter dial 21 which is provided on the side opposite to the LCD 17 with respect to the pentagonal prism unit 19.

Figure 2:
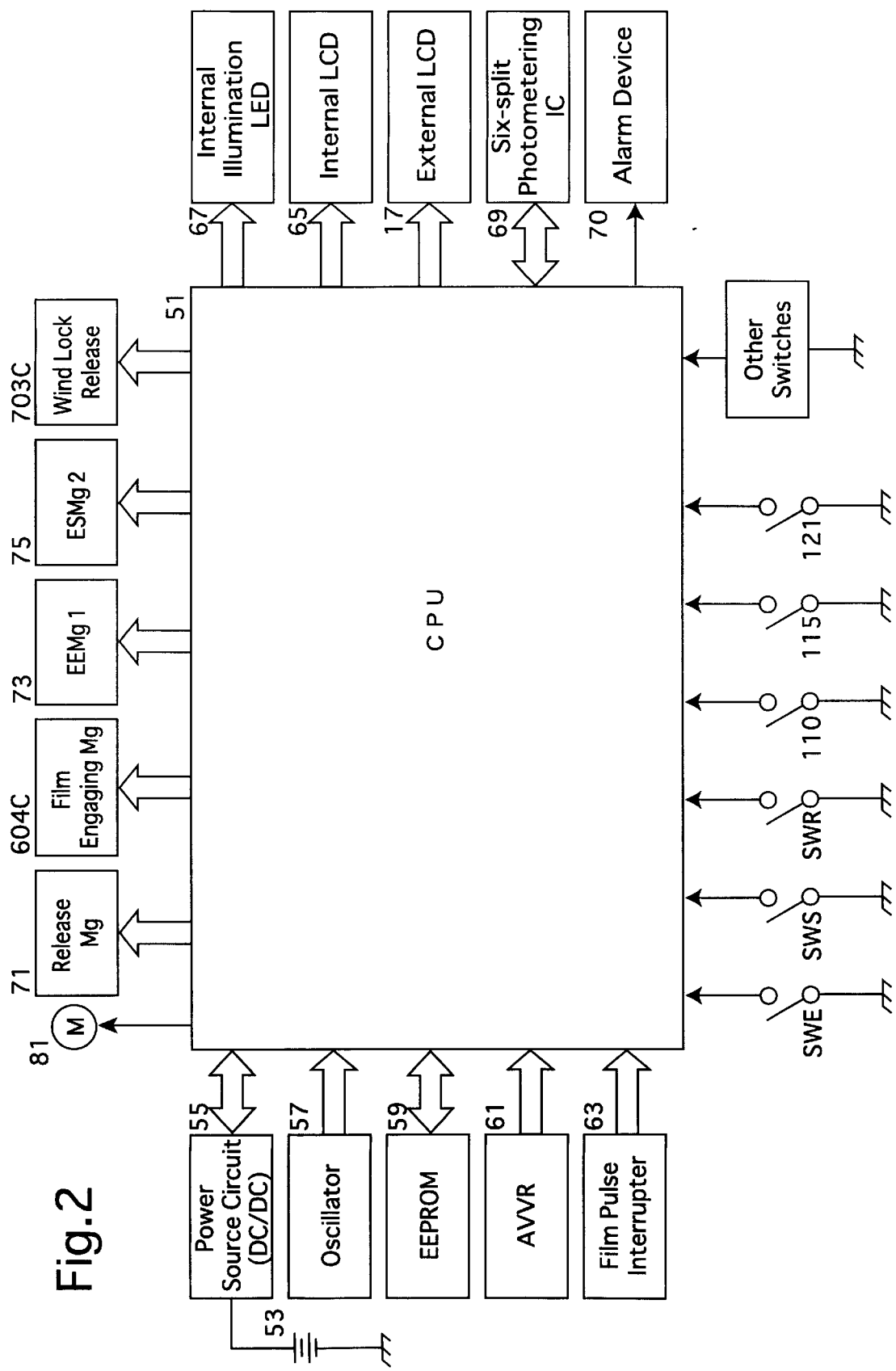
FIG. 2 is a block diagram of a main part of an embodiment of a film winding apparatus in a single lens reflex camera shown in FIG. 1.

FIG. 2 shows a circuit block diagram of a main part of a control system in the camera body 11. The camera body 11 includes a CPU 51 which serves as a control device for generally controlling the entire operation of the camera and a multi-wind prevention mechanism unlocking control device. The CPU 51 is supplied with power from a battery 53 and actuates an oscillator 57 in accordance with the constant voltage power which is converted by a DC/DC converter in the power circuit 55. Accordingly, the CPU 51 operates in response to the clock from the oscillator. The power of the battery 53 is supplied to electric or electronic devices or elements of the camera under control of the CPU 51.

The CPU 51 has input terminals which are connected to various switches, such as a photometering switch SWS and a release switch SWR, which are actuated in association with the release button 13; a preliminary angle switch 110 which is turned ON when the wind lever 15 is moved to the photographable position, in association with the wind lever 15; an intermediate angle position detection switch 115 which functions as a rotation detection switch (rotation detection device) which is turned ON or OFF each time the wind lever 15 is rotated by a predetermined angle from the wind start position toward the wind end position; a film identification switch 121 which is adapted to detect the kind of the film, a Brownie 120 or 220 film, for example, and a wind completion switch SWE which is turned ON when the trailing curtain is moved to a movement extremity in which the aperture is closed by the trailing curtain.

Furthermore, connected to the CPU 51 are a EEPROM 59 in which predetermined photographing data, such as set photographing modes or the number of exposed film frames is written; an AVVR (Aperture Value Variable Resistor) 61 which detects the diaphragm value of a photographing lens attached to the camera; a photo-interrupter (encoder) 63 which detects the movement of the film, upon winding, for example; the external LCD 17 in which the ISO film speed, the shutter speed, the bulb, photographing modes, a battery state, the number of the exposed frames, a film feed state, etc., are indicated; an LCD 65 provided within the finder; an LED 67 for illuminating the LCD 65 within the finder; and a six-split photometering IC 69 which is adapted to measure the object brightness. Furthermore, an alarm device (acoustic alarm device) 70 which send out an alarm signal for the film winding operation is connected to the CPU 51.

The camera body 11 is provided with a focal-plane shutter mechanism which is per se known, as a shutter device. The shutter mechanism includes leading and trailing curtains, leading and trailing curtain shutter springs as elastically biasing members for carrying out the shutter operation, and a charging mechanism therefor. The shutter device is also provided with electromagnets, including a release magnet 71 which mechanically engages the leading and trailing curtain shutter springs which are charged by the charging motor 81 which operates in association with the rotation of the wind lever 15 and releases the mechanical engagement upon releasing, and leading and trailing curtain magnets 73 and 75 which attract and engage the leading and trailing curtain shutter springs due to an electromagnetic force instead of the mechanical engagement.

Figure 6:
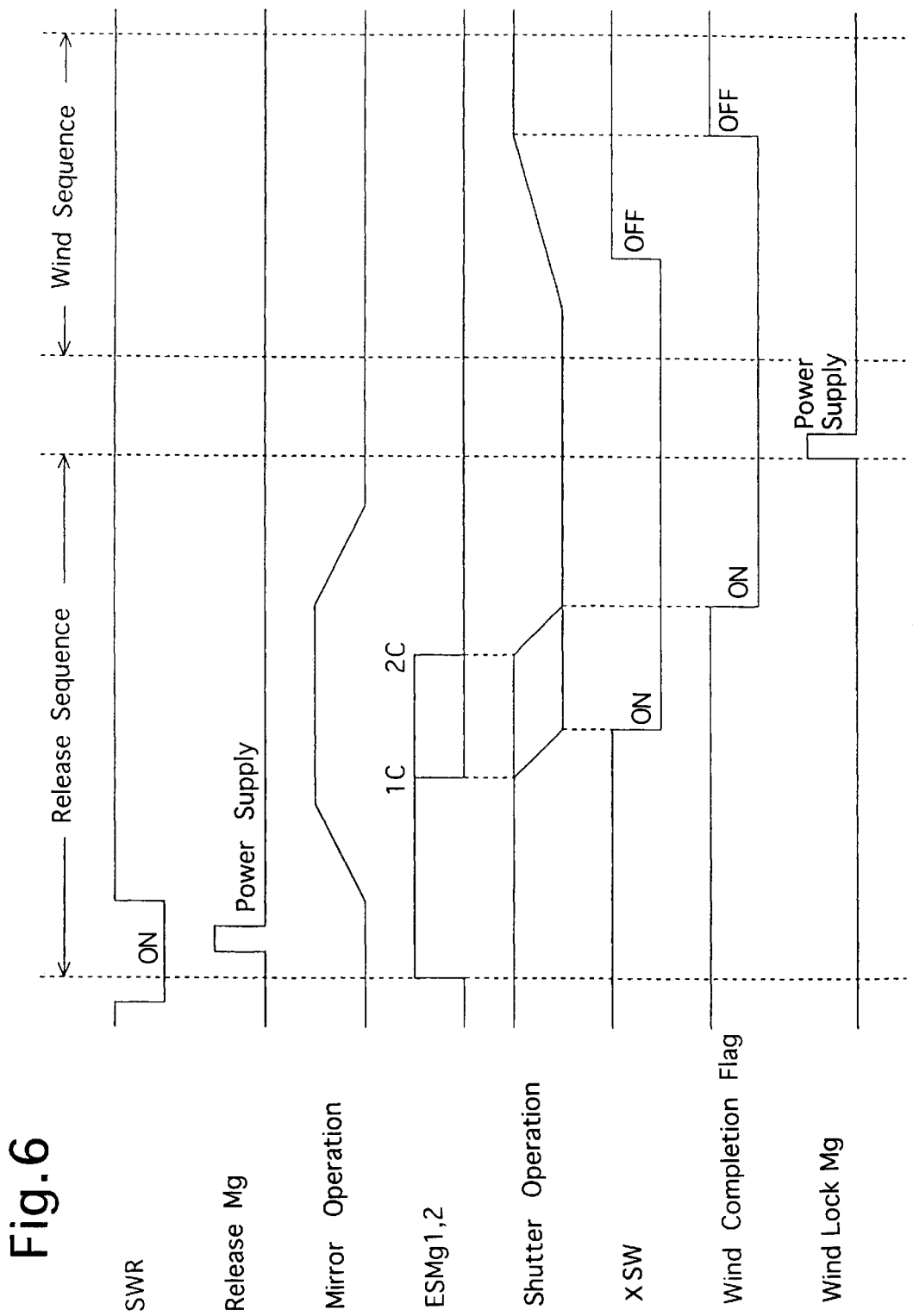
FIG. 6 is a timing chart of a release operation in a single lens reflex camera shown in FIG. 1.

In the release sequence in which the shutter button 13 of the camera body 11 is depressed, the mirror is moved upward, the leading and trailing curtains are moved, and the mirror is moved downward as shown in FIG. 6.

The camera body 11 includes a film engagement coil 604A which disengages the wind lever 15 from a film winding spool to stop the film feed regardless of the film winding operation of the wind lever 15, and a wind lock releasing coil (unlocking coil or double winding prevention releasing coil) 703C which releases the locking of the wind lever 15 by the double winding prevention mechanism 700, so as to rotate the wind lever to thereby wind the film. The operation of these magnets, i.e., the power supply and interruption of the power supply are controlled by the CPU 51.

Figure 3:
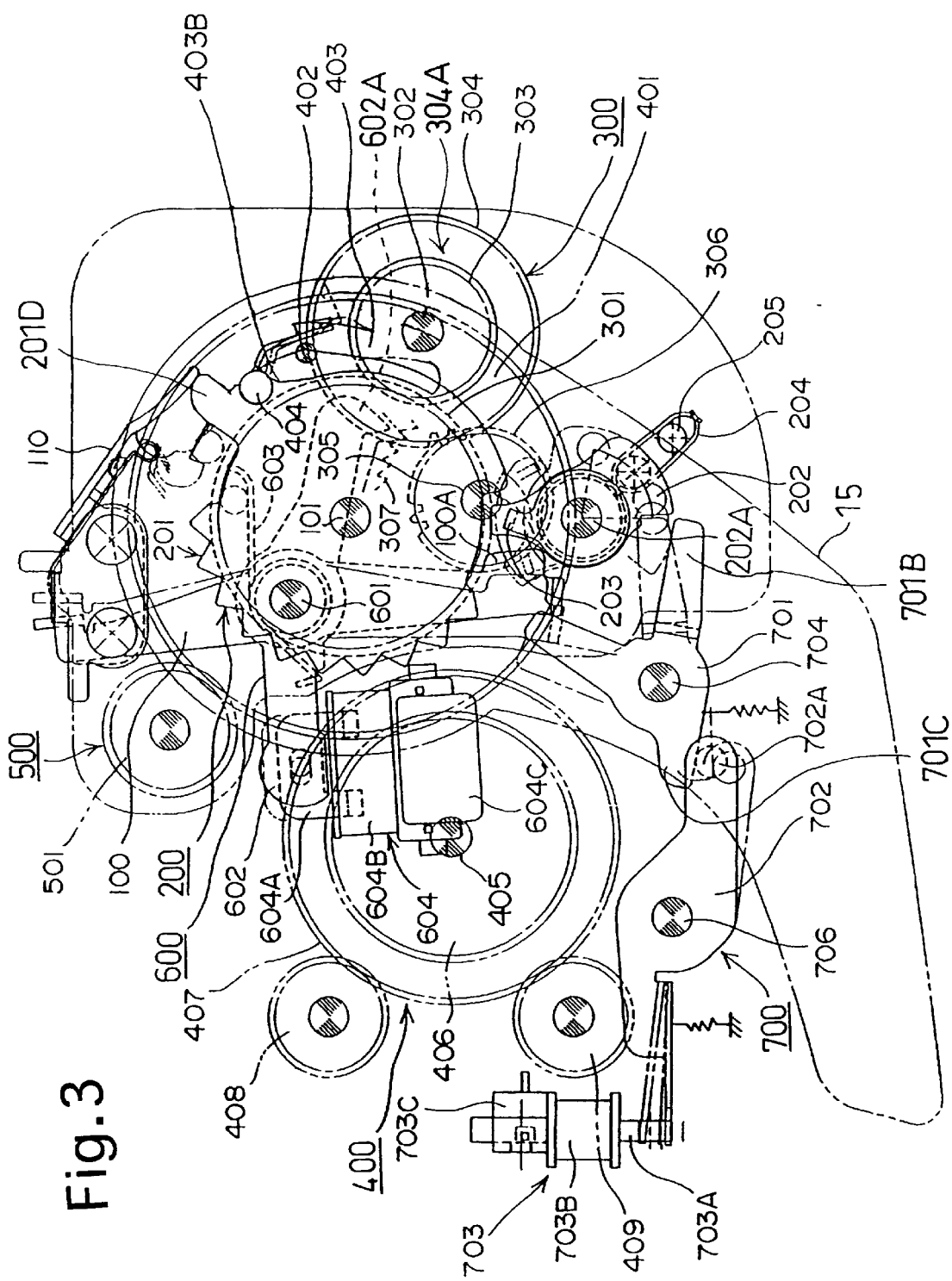
FIG. 3 is an enlarged plan view of a double winding prevention mechanism in a film winding apparatus shown in FIG. 2.
Figure 4:
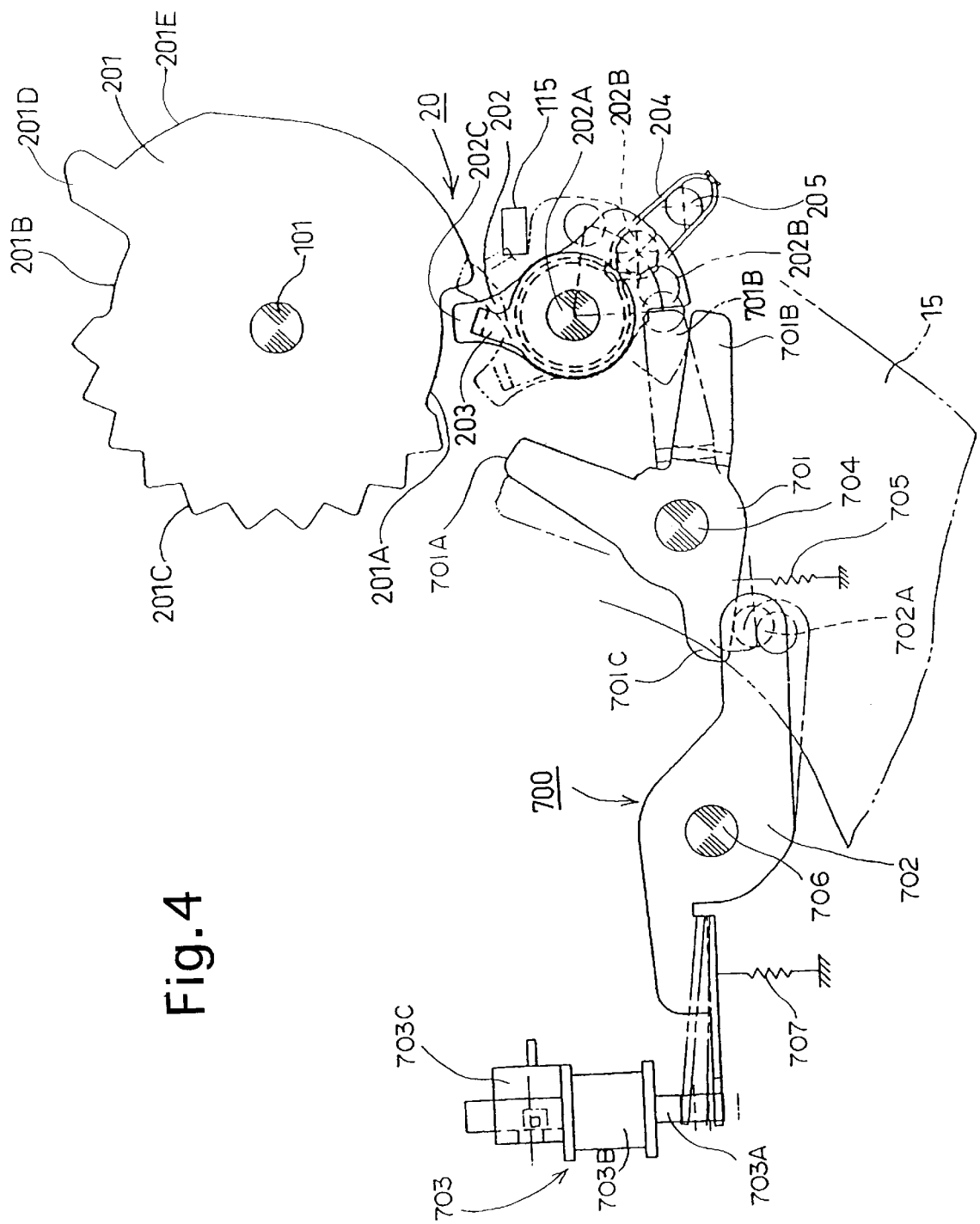
FIG. 4 is an explanatory view of an operational relationship between a ratchet wheel and a pawl of a double winding prevention mechanism shown in FIG. 3.
Figure 5:
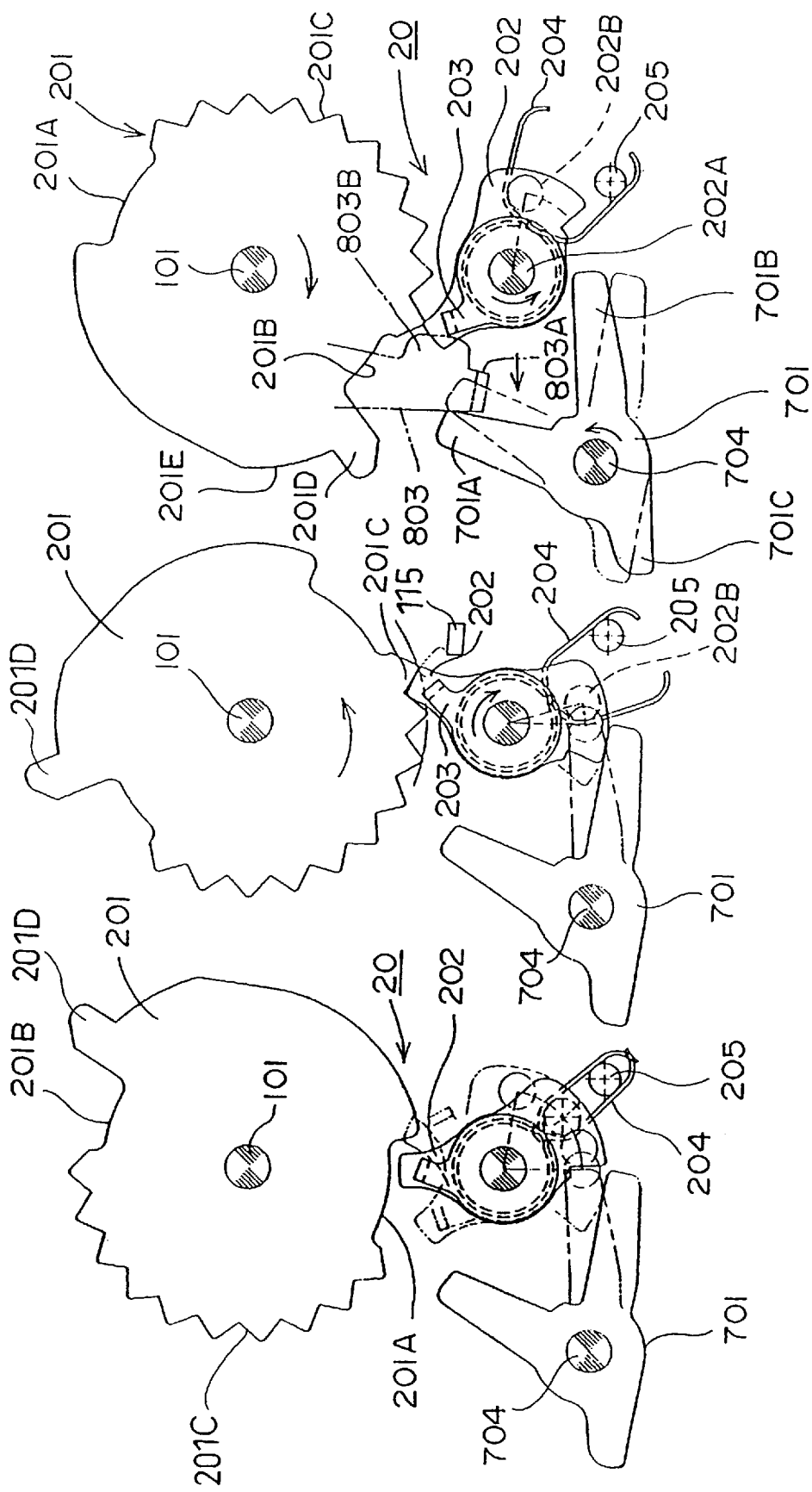
FIGS. 5A, 5B and 5C are schematic views of a main part of a control system provided in a single lens reflex camera body in FIG. 1, shown in different positions.

The main part of the film winding apparatus will be discussed below with reference to FIGS. 3 through 5. FIG. 3 shows a schematic plan view of the film winding apparatus provided in the camera body 11 for a Brownie film. FIG. 4 is an enlarged plan view of a double winding prevention mechanism in the film winding apparatus shown in FIG. 3. FIG. 5 shows an explanatory view of the operation of the double winding prevention mechanism.

The film winding apparatus includes the wind lever 15, the ratchet mechanism 200 which is adapted to hold the wind lever 15 at an optional intermediate wind position if the user releases the wind lever 15 during the manual winding operation, a film wind driving mechanism 300 which operates in association with the rotation (winding operation) of the wind lever 15, a film wind stop device 600 which stops the feed of a film when a predetermined amount (length) of film is fed in the wind direction regardless of the film winding operation of the wind lever 15, and a double winding prevention mechanism 700 which prevents a double winding (multi-winding) of the film. Furthermore, the film winding apparatus includes a shutter charge drive system and a mirror charging system, which are driven by the charging motor 81.

The wind lever 15 is supported by a shaft 101 which is rotatably mounted to a base plate to swing in a preliminary angular motion range from the lever accommodation position to the wind start position and between the wind start position and the wind end position (i.e., approximately 180 degrees from the lever accommodation position), and is continuously biased to be automatically returned to the lever accommodation position by a torsion spring or the like (not shown).

The ratchet mechanism (winding operation device) 200 includes a ratchet wheel 201 which is coaxially connected to the shaft 101 of the wind lever 15, and a pawl 202 which engages with the teeth of the ratchet wheel 201. The angular displacement of the ratchet wheel 201 is restricted by stops (not shown) so as to rotate within an angle range of approximately 180 degrees between the accommodation position and the wind end position.

The ratchet wheel 201 is provided with first and second cut-away portions 201A and 201B which are spaced at an angle corresponding to the angular displacement of the wind lever 15 (between the accommodation position and the wind end position) in the circumferential direction away from one another. The ratchet wheel 201 is provided on the peripheral surface thereof with serrated ratchet teeth 201C between the first and second cut-away portions 201A and 201B, so that the pawl 202 engages with the ratchet teeth 201C. The ratchet wheel 201 is also provided with a projection 201D which projects in the radial direction adjacent to the second cut-away portion 201B.

The pawl 202 is rotatably supported by a base plate through the shaft 202A to be brought into the first cut-away portion 201A of the ratchet wheel 201 when the wind lever 15 is in the accommodation position. The pawl 202 is provided with a set lever 203 integral therewith, which holds the pawl 202 of the double winding prevention mechanism 700 in the unlocked position, i.e., a reset position (double winding prevention release position), via a first wind lock lever 701.

The pawl 202 is also provided with a torsion spring 204 coaxial to the shaft 202A. The opposed ends of the torsion spring 204 are engaged by a spring retainer 202B projecting from one end of the pawl 202, on opposite sides of the spring retainer 202B. The ends of the torsion spring 204 hold therebetween a stationary pin 205 provided on the base plate.

The pawl 202 is located in a neutral position shown in FIGS. 4 and 5A by the torsion spring 204 when the pawl portion 202C of the pawl 202 is in the first cut-away portion 201A or second cut-away portion 201B of the ratchet wheel 201.

When the wind lever 15 is in the preliminary angular motion range (between the accommodation position and the wind start position), the pawl 202 is in the neutral position and the pawl portion 202C thereof engages in the first cut-away portion 201A (FIG. 5A). The preliminary angle switch 110 is pressed by the projection 201D of the ratchet wheel 201. In this state, the preliminary angle switch 110 is OFF.

When the wind lever 15 is rotated toward the wind end position beyond the wind start position of the preliminary angular motion range, rotating the ratchet wheel 201 in the winding direction, the projection 201D is disengaged from the preliminary angle switch 110, so that the preliminary angle switch 110 is turned ON.

When further rotation of the wind lever 15 toward the wind end position takes place to cause the ratchet wheel 201 to rotate further in the winding direction, the pawl portion 202C of the pawl 202 is pressed by an oblique boundary surface between the first cut-away portion 201A and the ratchet teeth 201C, so that the pawl 202 is tilted in a first direction against the spring force of the torsion spring 204. The pawl portion 202C rides over the crests of the ratchet teeth 201C while permitting the wind lever 15 to rotate to wind the film, and engages with the bottom of one of the teeth 201C to establish a ratchet engagement (FIG. 5B). Consequently, if the user releases the wind lever 15 during the winding operation or biases the wind lever 15 in the wind start direction, the pawl portion 202C of the pawl 202 engages with the ratchet teeth 201C of the ratchet wheel 201 so that the wind lever 15 is locked and is prevented from being rotated toward the wind start position.

Note that each time the pawl 202 rides over crests of the ratchet teeth 201C and swings in the first and second directions, in accordance with the rotation of the ratchet wheel 201 in the wind direction, the intermediate position detection switch 115 is turned ON and OFF to generate one pulse. Consequently, when the wind lever 15 is rotated by an angle corresponding to one frame, the intermediate position detection switch 115 outputs pulses corresponding to the number of the ratchet teeth 201C. The CPU 51 detects the pulses generated from the intermediate position detection switch 115 so that the winding of the wind lever 15 for each tooth can be detected. Thus, it can be detected that the film is being wound. In other words, if the wind lever is released intermediately during the winding operation, the intermediate release can be detected due to an absence of the intermediate position detection pulses. Namely, if the wind lever 15 is released during the winding operation, the commencement of the re-winding can be detected when the intermediate position detection switch 115 is turned ON.

When the wind lever 15 is rotated to the wind end position, the pawl portion 202C of the pawl 202 enters the second cut-away portion 201B, so that the pawl is returned to the neutral position. When the wind lever 15 is rotated in the reverse direction (return direction) from the wind end position toward the wind start position, the ratchet wheel 201 is rotated in the return direction; so that the pawl 202 is tilted in the second direction, opposite the first direction, and rides over the ratchet teeth 201C of the ratchet wheel 201 to permit the ratchet wheel 201 to rotate in the return direction (FIG. 5C).

Subsequently, if the user releases the wind lever 15 at the wind end position, the wind lever 15 tends to rotate toward the wind start position due to the biasing force of the spring. In this state, the pawl 202 is tilted in the second direction to permit the ratchet teeth 201 to pass and hence, the wind lever 15 is rotated toward the wind start position. Consequently, the wind lever 15 is returned to the preliminary angular motion range shown in FIG. 5A, so that the preliminary angle switch 110 is turned OFF.

The film wind driving mechanism 300 includes a first gear 301 coaxially secured to the shaft 101 of the wind lever 15; a second gear 303 which is secured to the shaft 302 rotatably supported by the base plate and which is in mesh with the first gear 301; a third gear 304 which is mounted to the shaft 302 via a one-way clutch (friction clutch) 304A which connects only in one direction identical to the film winding direction; a fourth gear 306 which is in mesh with the third gear 304 and which is rotatably supported by a spool shaft 305 which is in turn rotatably supported by the base plate; and a spool ratchet wheel 307 secured to the spool shaft 305 and connected to the fourth gear 306 through the friction clutch 304A. The film wind driving mechanism 300 operates in association with the rotation of the wind lever 15 to rotate the winding spool fitted to the spool shaft 305 to thereby wind the film onto the winding spool.

In the shutter charge driving mechanism, the CPU 51 drives the charging motor 81 in response to the ON signal of the preliminary angle switch 110 which is turned ON when the wind lever 15 is rotated from the preliminary angular motion range toward the wind end position, to thereby charge the shutter device and the mirror device. In the charging operation, the leading and trailing curtains of a focal-plane shutter per se known are moved to a charge position, and the leading and trailing curtain driving springs are charged. In the mirror charge driving system, a mirror driving spring for a quick return mirror, per se known is charged by the charging motor 81.

The film wind stop device 600 includes a film wind stop lever (engaging lever) 602 which is rotatably supported at the intermediate portion thereof by the shaft 601 provided on the base plate, and is provided on one end thereof with an engaging portion 602A which is disengageably engaged by the spool ratchet wheel 307 of the film wind driving mechanism 300; a torsion spring 603 which biases the engaging lever 602 in the clockwise direction (in a direction to engage the engaging portion 602A with the ratchet wheel 307); and an engagement control device 604 which is connected to the other end of the engaging lever 602. The engagement control device 604 includes an armature 604A connected to the other end of the engaging lever 602, a film engaging magnet 604B which attracts the armature 604A to retain the engaging lever 602 in a reset position (disengagement position) in which the engaging lever 602 is disengaged from the spool ratchet wheel 307, and a film engaging coil 604C which is energized to reduce the attractive force of the film engaging magnet 604B to thereby release the reset state of the engaging lever 602, when the amount of the film to be fed is at a predetermined value. The time at which the film engaging coil 604C of the engagement control device 604 is energized or activated is controlled in accordance with a signal from the film feed amount detection device which will be discussed hereinafter. The resetting of the engaging lever 602 is mechanically carried out by the trailing curtain movement completion lever (not shown) which operates upon completion of the movement of the trailing curtain of the shutter.

The double wind prevention device 700 includes a first wind lock lever 701, a second wind lock lever 702, and a lock control device 703. The first wind lock lever 701 is Y-shaped in a plan view and is rotatably supported by the camera body via a shaft 704 at the center portion of the first wind lock lever 701. The first wind lock lever 701 is biased by a spring 705 in the counterclockwise direction. The second engagement portion 701B is located so that the front end thereof comes into contact with the spring engaging projection 202B of the pawl 202 when the first wind lock lever 701 is rotated in the counterclockwise direction. In the state indicated by a dotted and dashed line in FIG. 4 in which the projection 202B abuts against the front end of the second engaging portion 701B, if the user tries to rotate the wind lever 15 to wind the film prior to the releasing operation, the rotation of the ratchet wheel 201 in the winding direction (counterclockwise direction) is locked since the projection 202B abuts against the front end of the second engagement portion 701B to prevent the rotation of the pawl 202 in the clockwise direction. Thus, no double winding of the film occurs.

The second wind lock lever 702 which is rotatably supported by the camera body via the shaft 706 abuts, at one end thereof adjacent to the first wind lock lever 701, against the third engagement portion 701C of the first wind lock lever 701 via the projection 702A. The second wind lock lever 702 is connected at the other end thereof to the lock control device 703. The second wind lock lever 702 is biased to rotate in a direction to release the locking of the first wind lock lever 701 (counterclockwise direction) by the spring 707.

The lock control device 703 includes an armature 703A secured to the other end of the second wind lock lever 702, a wind lock magnet (permanent magnet) 703B which attracts the armature 703A to retain the first and second wind lock levers 701 and 702 in the reset position (double wind prevention position indicated by a phantom line in FIG. 3), and a wind lock releasing coil 703C which is energized under predetermined conditions to reduce the attractive force of the wind lock magnet 703B to thereby release the first and second wind lock levers 701 and 702, so that the latter can be rotated to the double wind prevention release position. Namely, since the armature 703A is retracted in the wind lock releasing coil 703C and is attracted by the wind lock magnet 703B when the wind lock releasing coil 703C is not activated or energized, the first and second wind lock levers 701 and 702 are rotated to the double wind prevention position. However, when the wind lock releasing coil 703C is supplied with electricity, the armature 703A projects from the wind lock releasing coil 703C, so that the first and second wind lock levers 701 and 702 are rotated to the double wind prevention release position. Namely, the film can be wound by rotating the wind lever 15.

In the illustrated embodiment, the wind lock is unlocked by activating the wind lock releasing coil 703C when the wind lever 15 is returned from the wind end position to the preliminary angle motion range and either: (1) while the back cover is open; (2) a predetermined amount of film is fed upon indexing of the first frame; (3) upon completion of the shutter release, the movement of the trailing curtain of the shutter is completed, so that the wind completion switch SWE is turned ON; (4) the shutter release for the exposed last frame is completed; or (5) the film is subsequently wound.

The preliminary angle switch 110 is OFF when the wind lever 15 is in the preliminary angular motion range shown in FIGS. 3 and 5, and is turned ON when the wind lever 15 is rotated beyond the wind start position from the preliminary angular motion range, respectively. The preliminary angle switch 110 is mounted to the base plate and is insulated therefrom. When the wind lever 15 is within the preliminary angular motion range, the preliminary angle switch 110 is pressed by the projection 201D of the ratchet wheel 201 and generates an OFF signal. When the wind lever is rotated from the wind start position in the winding direction, the projection 201D of the ratchet wheel 201 is disengaged from the preliminary angle switch 110 which outputs an ON signal. The preliminary angle switch 110 is a spring contact and biases the wind lever 15 which is in the preliminary angular motion range, toward the accommodation position.

Figure 23:
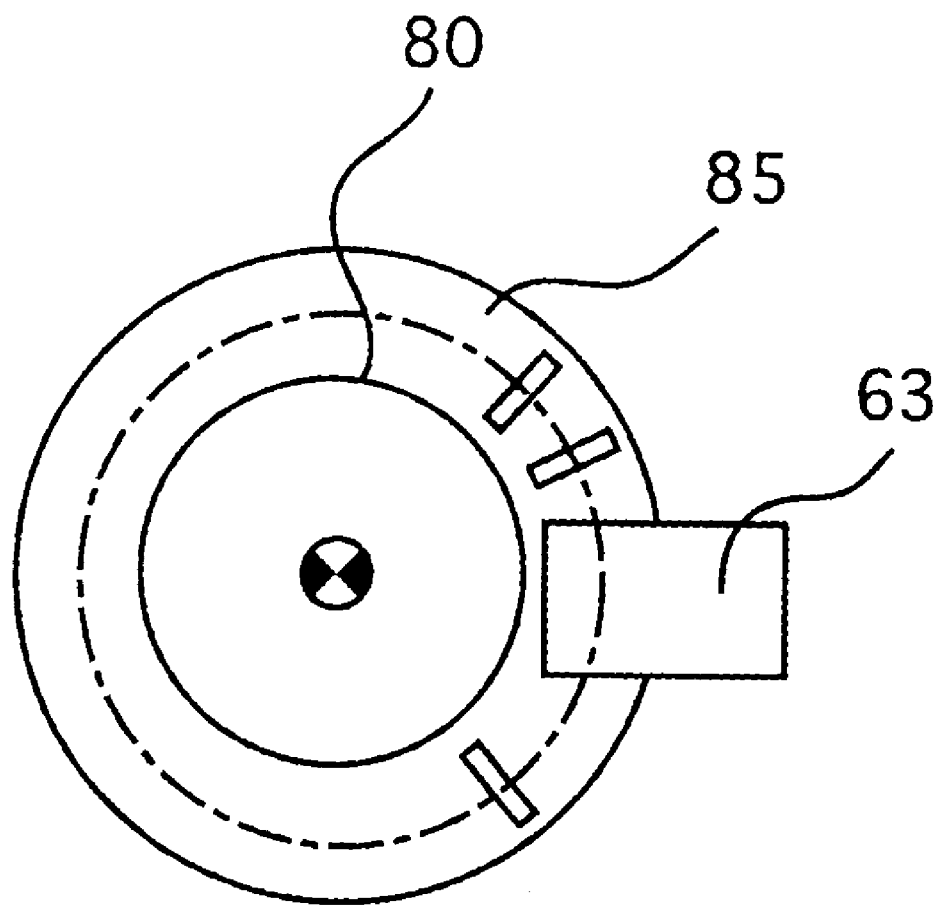
FIG. 23 is a schematic view of a film feed amount detection device, according to the present invention.

As shown in FIG. 23, the photo-interrupter 63 is provided as a film feed amount detection device with an encoder plate 85 which is rotated by a film roller 80 which is in contact with the film and is rotated in association with the feed of the film, and a light emitter and a light receiver on opposite sides of the encoder plate 85. When the rotation of the film roller 80 takes place in association with the feed of the film, the light receiver receives light emitted from the light emitter and passing through slits of the encoder plate 85, so that the photo-interrupter 63 outputs electrical pulse signals which represent the quantity of light received by the light receiver. The number of the pulses which are generated each time the film roller 80 rotates by a predetermined angle is counted by the CPU 51. The CPU 51 counts the number of output pulses of the photo-interrupter 63 in accordance with the movement of the film detects the amount or length of the fed film.

The photo-interrupter 63 is a transmission photo-interrupter, however, a reflection type can be alternatively utilized. Namely, the structure of the photo-interrupter is not limited to that of the illustrated embodiment.

Figure 7:
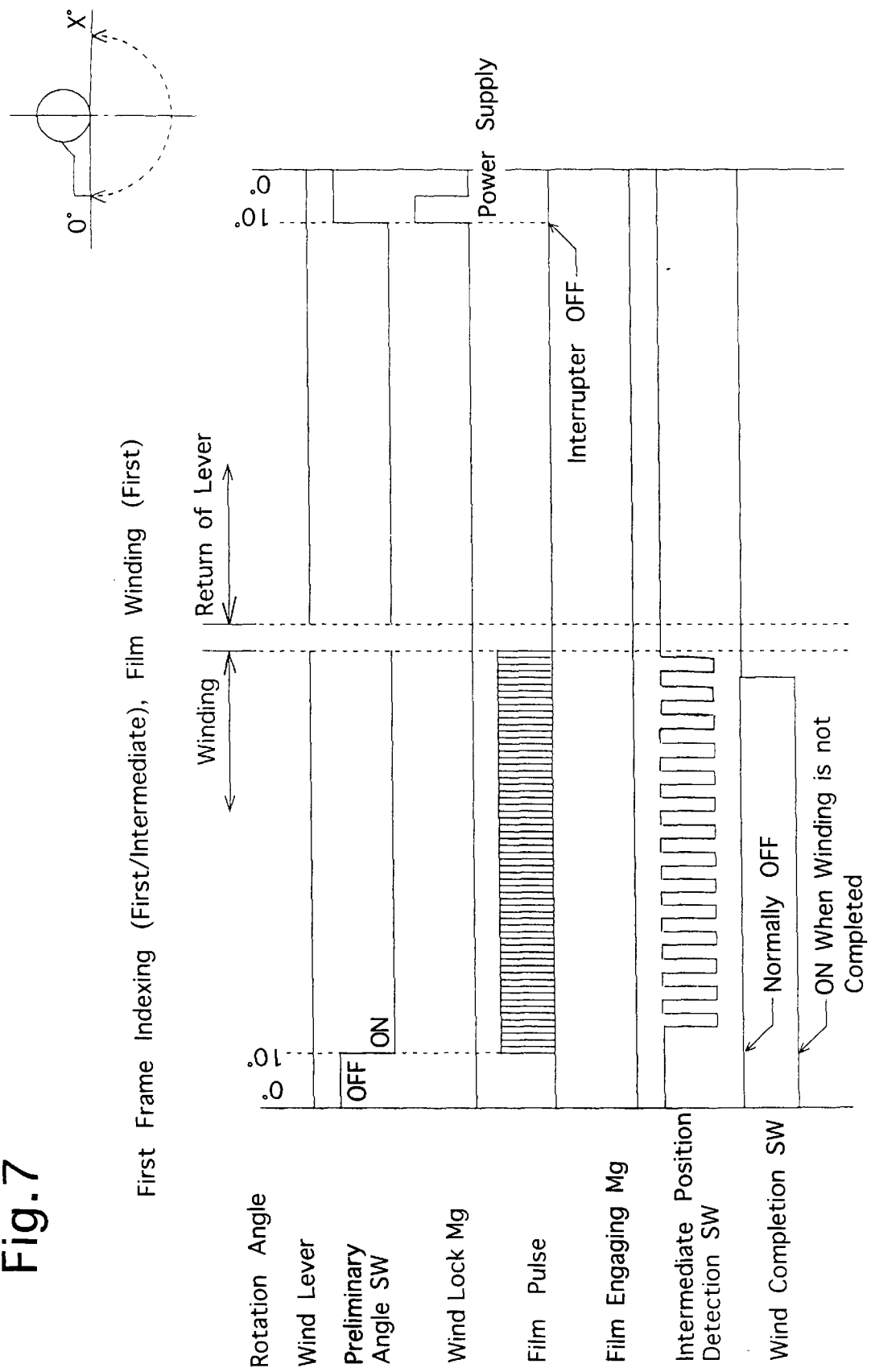
FIG. 7 is a timing chart of an idle-winding operation in a single lens reflex camera shown in FIG. 1.

The mechanical operation of the embodiment of the invention constructed as above will be described below with reference to a timing chart shown in FIG. 6 which shows the sequence from the shutter release operation to the film winding-up operation, and with reference to timing charts shown in FIGS. 7 through 9.

A photographing lens (not shown) is mounted to the camera body 11; a Brownie film is loaded in the camera body; a start line printed on the backing paper of the film is registered with indicia on the camera body; and the rear cover of the camera (not shown) is closed. In this state, the film indexing operation in which the film is idle-fed until the first frame is placed in the aperture of the camera body is carried out as described below (see the timing chart shown in FIG. 7).

In the film indexing operation, the wind lever 15 is rotated from the wind start position to the wind end position (counterclockwise direction), is returned thereafter to the wind start position and is again rotated to the wind end position. The above-mentioned swing operations of the wind lever are repeated several times. Upon winding and rotating operation of the wind lever, the projection 201D of the ratchet wheel 201 which rotates together with the wind lever 15 is disengaged from the preliminary angle switch 110 and hence the preliminary angle switch 110 is turned ON. Consequently, the CPU 51 operates in response to the ON signal of the preliminary angle switch 110, so that the photo-interrupter 63 is actuated. The number of the pulses generated by the photo-interrupter 63 is counted by the CPU 51. Moreover, the CPU 51 detects the number of the pulses generated by the intermediate position detection switch 115 and judges whether or not the wind lever 15 is being rotated to wind the film.

In the operation, when the wind lever 15 is further rotated in the winding direction, the rotation of the gear 301 which rotates together therewith is transmitted to the spool shaft 305 through the gears 303, 304, and 306, the one-way clutch 304A, and the spool ratchet wheel 307 to wind the film. When the film roller 80 is rotated in association with the feed of the film, the photo-interrupter 63 outputs pulse signals each time the film roller 80 rotates by a predetermined angle. The number of pulses generated is counted by the CPU 51. Thereafter, the CPU 51 checks whether a frame immediately before the first frame of the film is located in the aperture of the camera body from the start mark of the film.

When the second cut-away portion 201B is opposed to the ratchet teeth 202C of the pawl 202, i.e., when the wind lever 15 is reversed by an angle corresponding to the second cut-away portion 201B after the wind lever has been rotated to the wind end position, the pawl 202 is rotated in the second direction, i.e., in the counterclockwise direction against the torsion spring 204 by the crests of the teeth 201C, as shown in FIG. 5C. Hence, the set lever 203 integral with the pawl 202 is rotated in the clockwise direction and the first wind lock lever 701 of the double wind prevention device 700 is rotated in the counterclockwise direction. At the same time, the second wind lock lever 702 is rotated in the clockwise direction. The armature 703A of the second wind lock lever 702 is attracted by the wind lock magnet 703B, so that the double wind prevention device 700 is retained in a reset position in which the double wind is prevented. In accordance with the rotation of the wind lever 15 in the return direction, the ratchet wheel 201 is rotated toward the wind start position together with the wind lever 15 while causing the pawl 202 to oscillate via the ratchet teeth 201C.

When the movement of the trailing curtain is completed, the engagement lever 602 is rotated by a member (not shown) associated with the movement of the trailing curtain in the counterclockwise direction in FIG. 3. The engagement lever is attracted and held in this state by the film engagement magnet 604B of the engagement control device 604 in the film wind stop device 600. The film wind stop device 600 is returned to the reset position. Thus, a subsequent film winding operation by the wind lever 15 can be carried out (FIGS. 4 and 5A).

Since the number of film pulses counted by CPU 51 does not amount to a value at which a frame immediately before the first frame of the film reaches the aperture of the camera body from the start mark of the film, it is necessary to return the wind lever 15 to the preliminary angular motion range and thereafter to rotate the wind lever to carry out idle-winding of the film, in order to move the first frame to a position approximately one frame before the aperture of the camera body. To this end, if the wind lever 15 is returned to the preliminary angular motion range, so that the preliminary angle switch 110 is turned OFF by the projection 201D of the ratchet wheel 201, the wind lock releasing coil 703C of the lock control device 703 in the double wind prevention device 700 is immediately supplied with electricity in accordance with the command of the CPU 51. Consequently, the wind lock releasing coil 703C is energized, and hence the magnetic force of the wind lock magnet 703B is instantly reduced. Thus, the second wind lock lever 702 which has been held in the reset position by the wind lock magnet 703B due to the magnetic attraction is rotated to the double wind prevention releasing position indicated by the solid line shown in FIG. 4 by the spring 707. At the same time, the first wind lock lever 701 is rotated to the double wind prevention releasing position indicated by the solid line in FIG. 4, so that the second engagement portion 701B is retracted and disengaged from the spring engagement projection 202B of the pawl 202. Consequently, the wind lever 15 can be rotated to wind the film.

When the wind lever 15 is rotated in the winding direction, the film is wound. The timing chart therefor is shown in FIG. 8. When the number of film pulses counted by CPU 51 is a value at which a frame immediately before the first frame of the film reaches the aperture of the camera body from the start mark of the film, the film engaging coil 604C of the engagement control device 604 in the film wind stop device 600 is immediately supplied with electricity in accordance with the command of the CPU 51. Consequently, the film engaging coil 604C is energized, and hence the magnetic force of the film engaging magnet 604B is instantly reduced. Thus, the engaging lever 602 which has been held in the reset position (disengagement position) by the film engaging magnet 604B due to the magnetic attraction is rotated in the engagement direction (clockwise direction in FIG. 3) to engage with the ratchet wheel 307 (to an engagement position) due to the biasing force of the torsion spring 603. Consequently, the feed of the film is stopped even during the winding rotation of the wind lever 15, so that the wind lever 15 idles.

If the user releases the wind lever 15 during the winding rotation of the wind lever, the front end of the pawl 202 abuts against the oblique surface of the ratchet teeth 201C of the ratchet wheel 201, as shown in FIG. 5B, and consequently, no return rotation of the ratchet wheel 201 occurs. Thus, it is possible to prevent the wind lever 15 from being returned during the winding operation.

If the wind lever 15 is released after it has reached the wind end position, the wind lever 15 is automatically returned to the accommodation position due to the biasing force of a return spring (not shown). If the preliminary angle switch 110 is turned ON, electricity is immediately supplied to the wind lock releasing coil 703C so that the first and second wind lock levers 701 and 702 are rotated to the double wind prevention releasing position, in accordance with the instructions of the CPU 51. Consequently, the winding rotation of the wind lever 15 can be carried out.

The winding operation of the last frame in the indexing operation will be discussed below.

Figure 8:
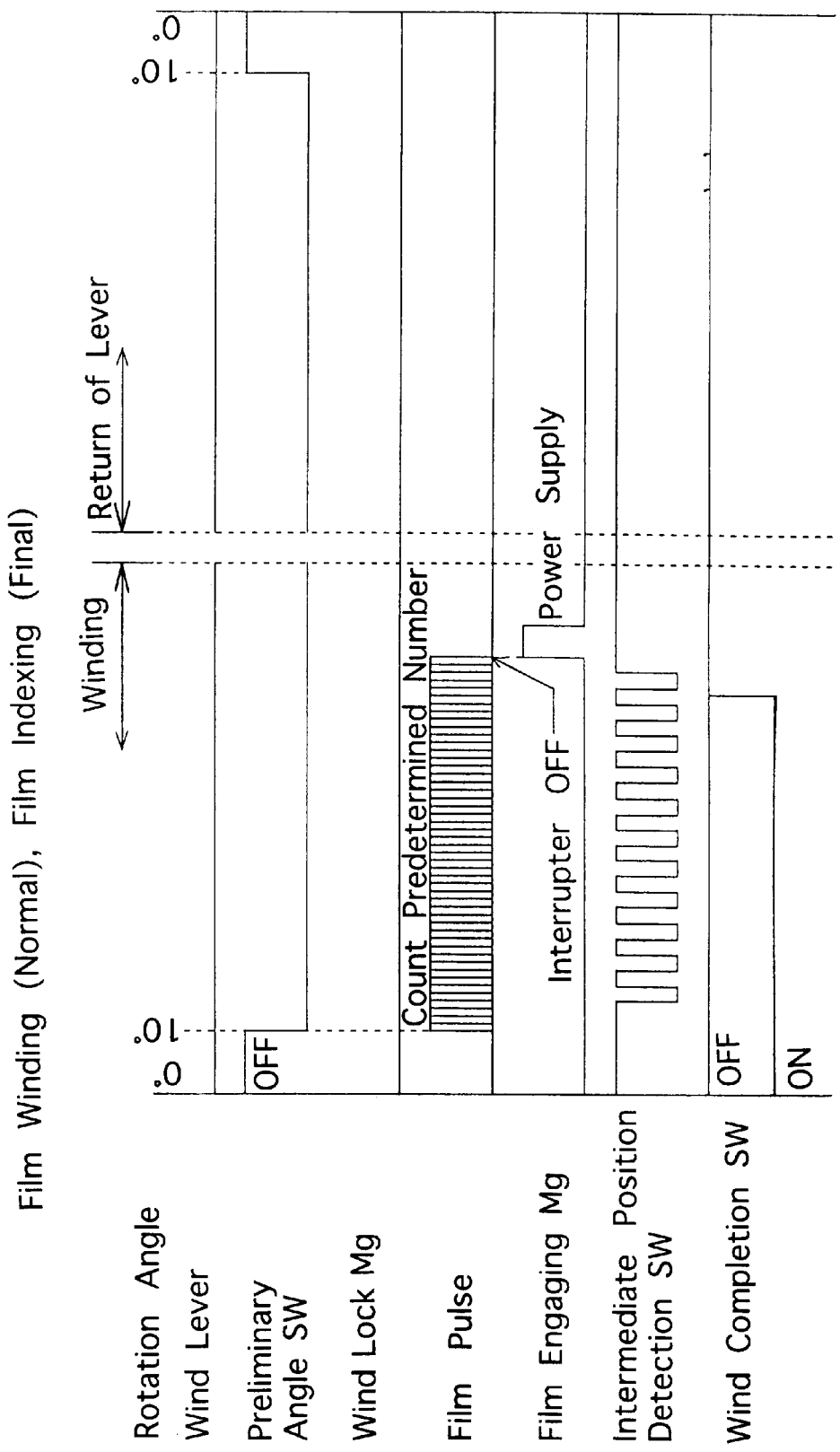
FIG. 8 is a timing chart of a film winding operation and a first frame indexing operation in a single lens reflex camera shown in FIG. 1.
Figure 9:
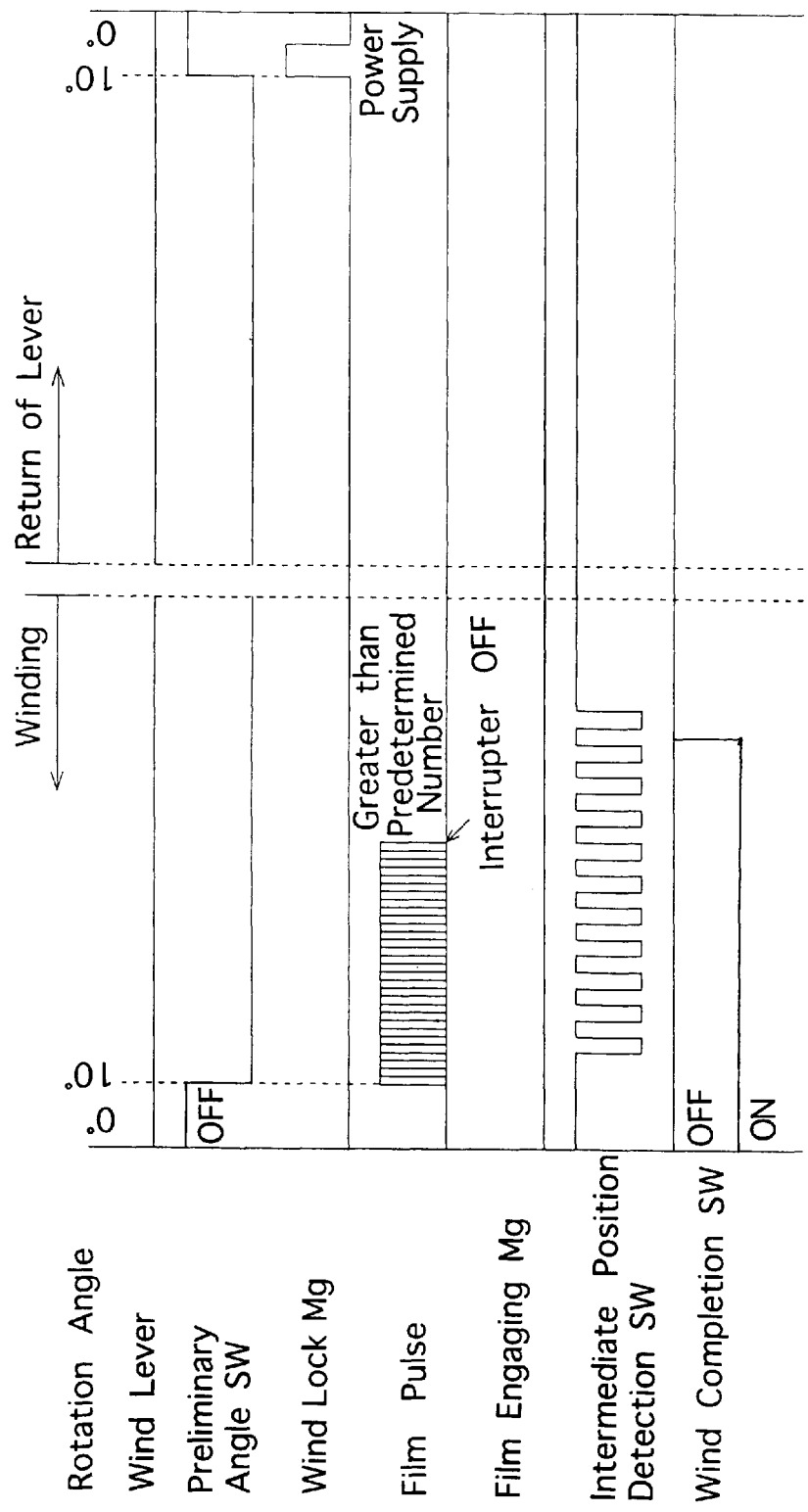
FIG. 9 is a timing chart of a film winding operation in a single lens reflex camera shown in FIG. 1.

The timing chart therefor is similar to that shown in FIG. 8. Namely, if the wind lever 15 is rotated at the wind start position when the film has been wound so that a frame immediately before the first frame of the film is located in the aperture, the CPU 51 drives the charging motor 81 to actuate the shutter charging mechanism and the mirror charging mechanism, as soon as the preliminary angle switch 110 is turned ON.

When the counted number of the film pulse counter is identical to the index value, the CPU 51 immediately supplies the film engaging coil 604C of the engagement control device 604 of the film wind stop device 600 with electricity to energize the film engaging coil to thereby stop the feed of the film. Consequently, the first frame of the film is moved to the aperture and can be exposed.

If the wind lever 15 is released after the wind lever 1 has reached the wind end position, the wind lever 15 is automatically returned to the accommodation position due to the biasing force of a return spring (not shown). If the preliminary angle switch 110 is turned ON, the CPU 51 does not activate the wind lock releasing coil 703C. Therefore, the first and second wind lock levers 701 and 702 are retained in the double wind prevention position, and accordingly no winding rotation of the wind lever 15 is permitted to prevent a double wind.

In the photographable state, if the release operation is carried out and the movement of the trailing curtain is completed, the winding completion switch SWE is turned ON. When the CPU 51 detects that the switch SWE is turned ON, the wind lock releasing coil 703C is supplied with electricity, so that the first and second wind lock levers 701 and 702 are released to thereby release the double wind prevention. Therefore, the user can wind the film by rotating the wind lever 15. The winding operation is similar to the winding operation of the last frame in the indexing operation.

The winding operation of the film after the last frame of a predetermined number of frames has been exposed will be discussed below with reference to timing charts shown in FIGS. 9 and 10.

The CPU 51 counts the number of the pulses generated from the film pulse counter and turns the photo-interrupter 63 OFF each time the counted number is a predetermined specific value by the one winding operation. When the wind lever 15 is returned to the preliminary angular motion range, the double wind prevention is released. When the preliminary angle switch is turned ON, the photo-interrupter 63 is turned ON and the film pulses are counted (FIG. 9).

Figure 10:
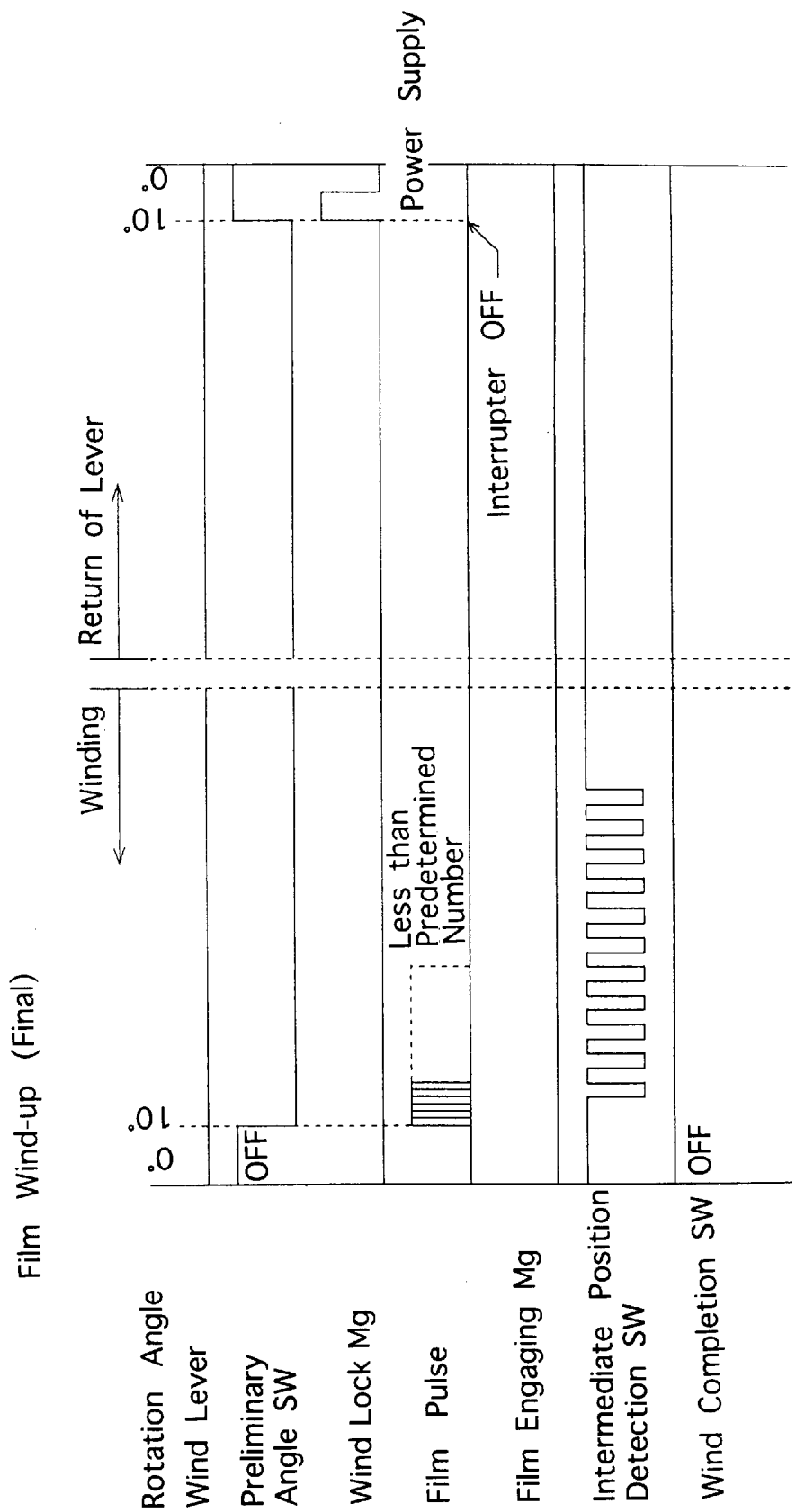
FIG. 10 is a timing chart of a film winding operation before the completion thereof, in a single lens reflex camera shown in FIG. 1.

If the number of the pulses counted in one winding rotation of the wind lever 15 is below the predetermined specific value, the film is completely wound on the spool (FIG. 10). The CPU 51 indicates in the display that the winding is completed and releases the double wind prevention mode, so that the winding rotation of the wind lever can be carried out.

The release and film feed operations in the single lens reflex camera will be discussed below in detail with reference to flow charts shown in FIGS. 11 through 21. The following operations are performed by the CPU 51 in accordance with the program stored in the internal ROM.

Figure 11:
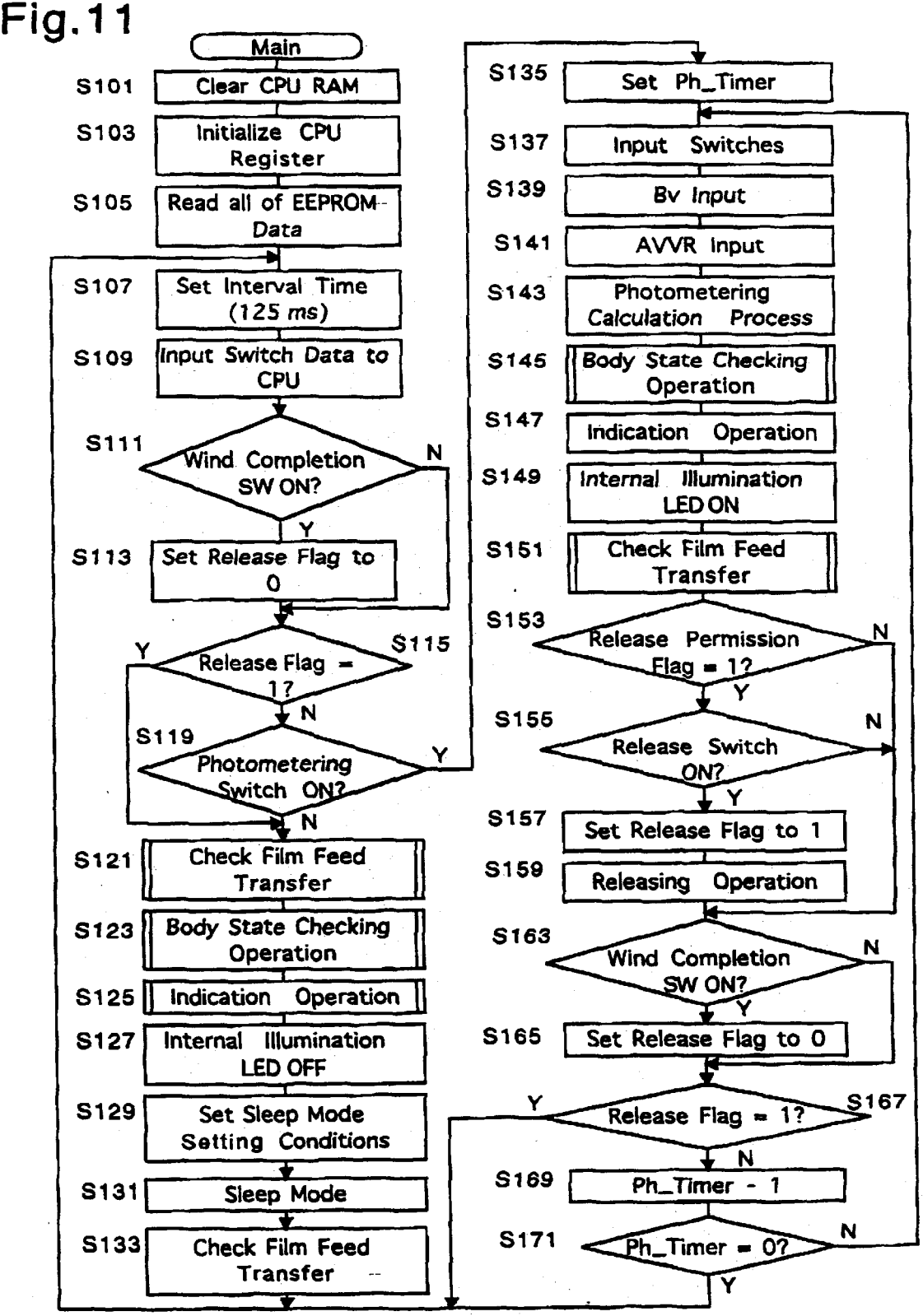
FIG. 11 is a flow chart of a main operation in a single lens reflex camera to which a photographing lens is attached.

FIG. 11 shows a main operation which operates when the battery 53 is loaded in the camera body 11. In the main operation, the status of the various switches is checked and corresponding operations are carried out in accordance with the detected switch status.

In the main routine, the internal RAM of the CPU 51 is set to 0; the register is initialized; predetermined data is read from the EEPROM 59; and a time interval (125 mS) is set to 1 (S101, S103, S105, S107). The time interval defines a period at which the switch checking operations are repeated in a sleep mode.

When the time interval is set, the state of the various switches, such as the photometering switch SWS, the release switch SWR, or the wind completion switch SWE, is input (S109), and whether or not the wind completion switch SWE is ON is checked (S111). If the wind completion switch SWE is ON, the release flag is set to 0 since the movement of the trailing curtain is completed and control proceeds to step S115 (S111, Y; S113). If the wind completion switch SWE is not turned ON, control proceeds to step S115 (S111, N).

At step S115, whether or not the release flag is set to 1 is checked. If the release flag is not set to 1, whether or not the photometering switch SWS is ON is checked (S115, N; S119). If the photometering switch SWS is not ON, control proceeds to step S121 (S119, N; S121). If the photometering switch SWS is ON (S119, Y; S135), control proceeds to step S135 to carry out the photographing operation.

If the photometering switch SWS is ON at step S119, the power hold timer (ph-timer) is set and the state of the switch is input (S135; S137). Thereafter, the object brightness data Bv is input through the photometering IC 69, and the diaphragm data of the photographing lens is input through the AVVR 61. Thereafter, the diaphragm value and the shutter speed for control are calculated and set in the brightness calculation operation (S139, S141, S143).

Thereafter, the body state is checked (S145). In the body state checking operation which will be discussed below in detail with reference to FIG. 13, whether or not the film is being wound is checked. If the film winding is completed, the release permission flag is set to 1, and if the movement of the trailing curtain is completed, the wind lock is released.

The photographing data such as the diaphragm value, the shutter speed, or the number of the exposed frames is indicated in the corresponding LCDs 17 and 65 (S147), and the illuminating LED 67 is turned ON (i.e., is lit) (S149). Also, the film feed transfer checking operation is carried out (S151).

Thereafter, whether or not the release permission flag is set to 1 is checked (S153), and whether or not the release switch SWR is turned ON is checked (S155). If the release permission flag is set to 1 and if the release switch SWR is ON (S153, Y; S155, Y), the release flag is set to 1 (S157) to perform the release operation along the sequence shown in FIG. 6 (S159).

Namely, in the release operation, the release flag is set to 1, and the leading curtain magnet 73 and the trailing curtain magnet 75 are supplied with electricity; and the release magnet 71 is supplied with electricity for a predetermined time. Thereafter, the power supply to the leading curtain magnet 73 is stopped to permit the leading curtain to move. After the lapse of the exposure time (shutter speed) set at step S143, the power supply to the trailing curtain magnet 75 is stopped to permit the trailing curtain to move. Thus, the release operation ends. In the illustrated embodiment, if the wind completion switch SWE is turned ON when the movement of the trailing curtain is completed, as will be discussed hereinafter, the power is instantly supplied to the wind lock releasing coil 703C, so that the double wind prevention device 700 is unlocked.

If any of steps S153 and S155 is NO, control skips steps S157 through S159 (S153, N; S155, N), and whether or not the wind completion switch SWE is ON is checked (S163). If the wind completion switch SWE is ON, the release flag is set to 0 since the movement of the trailing curtain is completed (S163, Y; S165). If the wind completion switch SWE is not turned ON, control skips step S165 (S163, N). Thereafter, whether the release flag is set to 1 is checked (S167). If the release flag is set to 1, it is deemed that the release operation is being carried out, i.e., the photographing operation (exposure) is being carried out in which the movement of the trailing curtain is not completed; therefore control is returned to step S107 (S167, Y).

If the release flag is not "1" (S167, N), it is considered that no release has begun, or the movement of the trailing curtain has ended and the release has completed. Therefore, the power hold counter is decreased by one (S169) and whether or not the counted number is "0" is checked (S171). If the counted number is not "0", control is returned to step S137 to repeat the release operation (S171, N), and if the counted number is "0", control is returned to step S107 (S171, Y).

If the release flag is set to 1 at step S115 (S115, Y), or if the photometering switch SWS is not turned ON (S115, N;

S119, N), control proceeds to step S121 to perform the film feed transfer checking operation and enters the sleep mode (S131) via the body state checking operation (S123), the indication operation (S125), the extinguishing operation of the illuminating LED in the finder (S127), and the sleep mode condition setting operation (S129).

At the sleep mode condition setting operation, the interruption by the photometering switch SWS, the release switch SWR, the wind completion switch SWE, the preliminary angle switch 110, and the intermediate position detection switch 115 or by the lapse of the time interval is permitted.

If control enters the sleep mode at step S131, the CPU 51 switches the operation to a low speed clock operation and interrupts the power supply to members other than the CPU 51, so that a power-save mode is established.

If the interruption and return conditions are met during the sleep mode, the CPU 51 switches to a high speed clock operation. Consequently, the film feed transfer checking operation is carried out at step S133 and control is returned to step S107.

Figure 12:
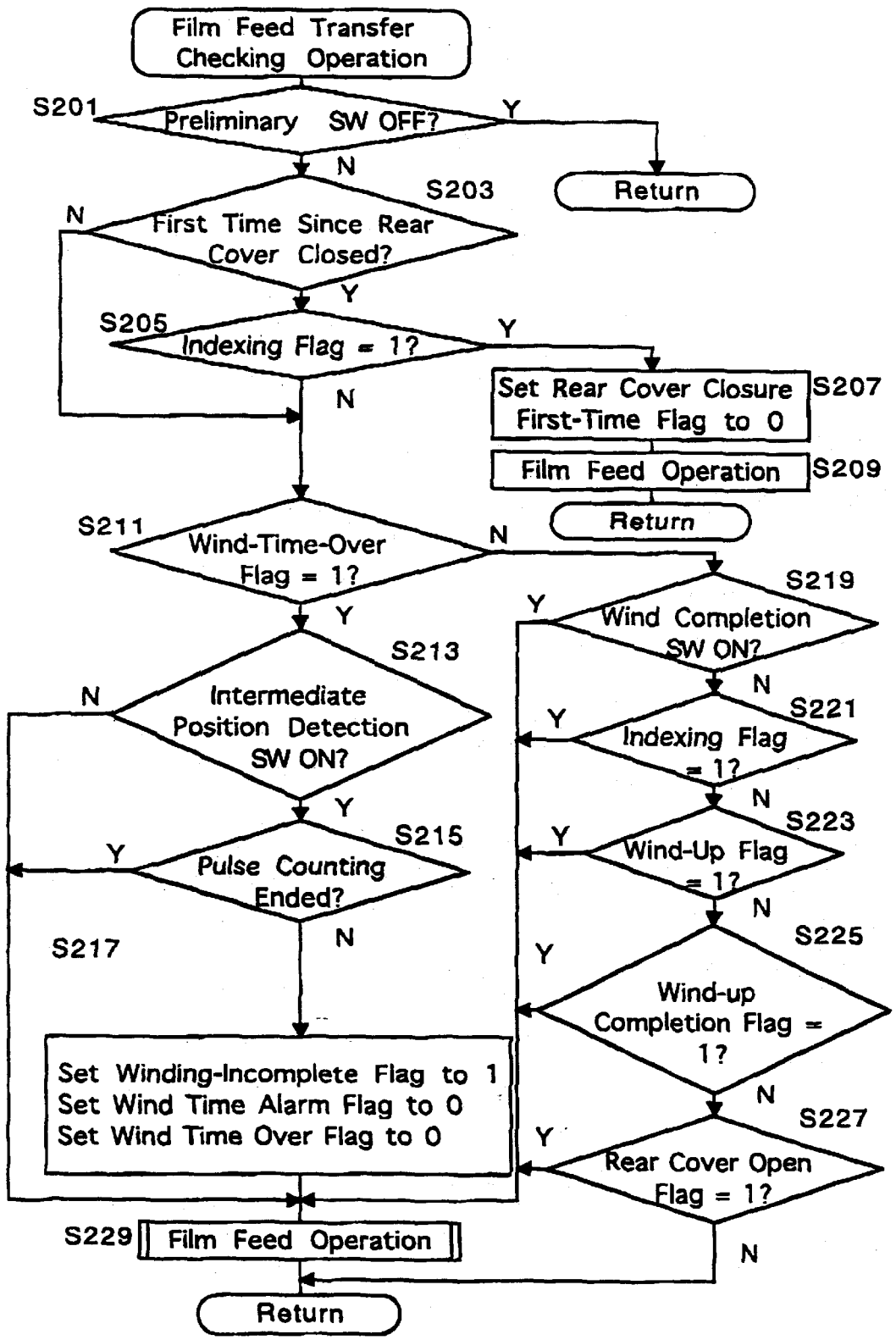
FIG. 12 is a flow chart of a film feed transfer checking operation in a single lens reflex camera shown in FIG. 1.

The film feed transfer checking operation which is carried out at steps S121, S133 and S151 in the main flow chart will be explained below, referring to flow charts shown in FIG. 12. In this operation, the states of the preliminary angle switch, the rear cover switch, and the wind completion switch SWE, are checked to detect the feed state of the film and to select the feed operation in accordance with the feed state.

In the film feed transfer checking operation, whether or not the wind lever 15 is in the photographable position is checked based on whether the preliminary angle switch 110 is OFF, and if the preliminary angle switch 110 is OFF, control is returned (S201, Y). If the preliminary angle switch is not OFF (S201, N), it is checked whether or not the film feed checking operation is carried out for the first time after the rear cover is closed. If the operation is the first time, it is checked whether the indexing flag is set to 1 (S203, Y; S205). If the indexing flag is set to 1, the rear cover closure first operation flag is set to 0 and the film feed operation is carried out (S205, Y; S207, S209). Thereafter control is returned.

If the operation is not for the first time after the closure of the rear cover (S203, N), or if the indexing flag is not set to 1 even if the operation is the first time operation, control proceeds to step S211 (S203, Y; S205, N). At step S211, it is checked whether or not the wind time over flag is set to 1. If the wind time over flag is set to 1, it is checked whether or not the intermediate position detection switch 115 is turned ON (S211, Y; S213). If the intermediate position detection switch is turned ON, it is checked whether or not the pulse counting ends (S213, Y; S215). If the pulse counting does not end (S215, N), the winding-incomplete flag is set to 1 and the wind time alarm flag and the wind time over flag are set to 0. Thereafter, control proceeds to the film feed operation (S217, S229). If the intermediate position detection switch 115 is not turned ON (S213, N), or if the pulse counting has ended even if the intermediate position detection switch is turned ON (S213, Y; S215, Y), control skips step S217 and proceeds to step S229 to perform the film feed operation.

If the wind time over flag is not "1" at step S211 (S211, N), it is checked whether the wind completion switch SWE is turned ON, whether indexing flag is set to 1, whether the wind-up flag is set to 1, whether the wind-up completion flag is set to 1, and whether the rear-cover-open flag is set to 1 (S219, S221, S223, S225, S227).

If any of steps S219 through S227 is affirmative (Y), control proceeds to the film feed operation (S229); otherwise, control skips the film feed operation and is returned (S219, N; S221, N; S223, N; S225, N; S227, N).

The indexing flag, the wind-up flag, and the rear-cover-open flag are set at steps S317, S329 and S309, respectively, in the body state checking operation shown in FIG. 13. The wind-up completion flag is set to 1 at step S845 in the wind-up operation shown in FIG. 19.

Figure 13A:
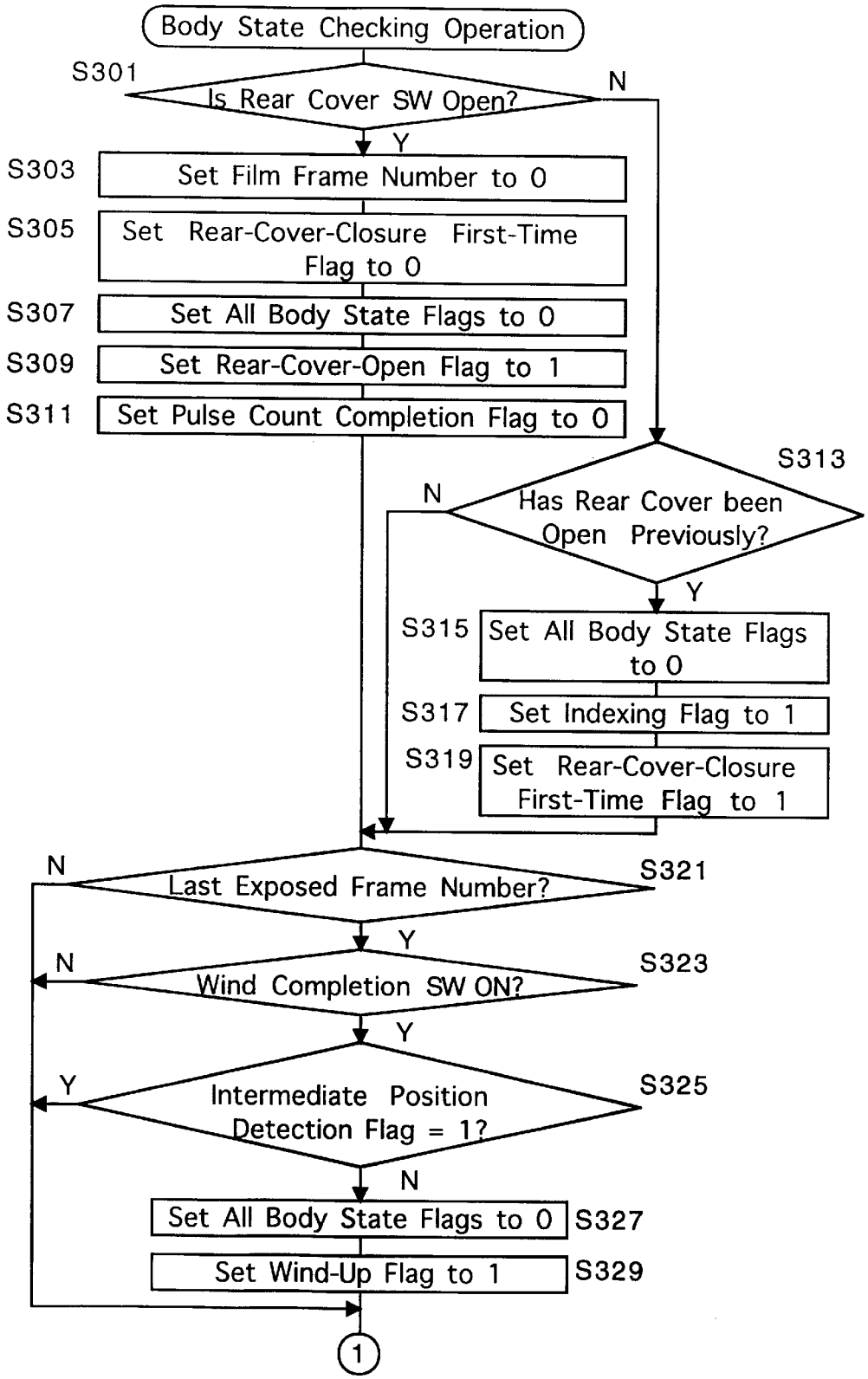
FIG. 13A is part of a flow chart of a body state checking operation in a single lens reflex camera in FIG. 1.
Figure 13B:
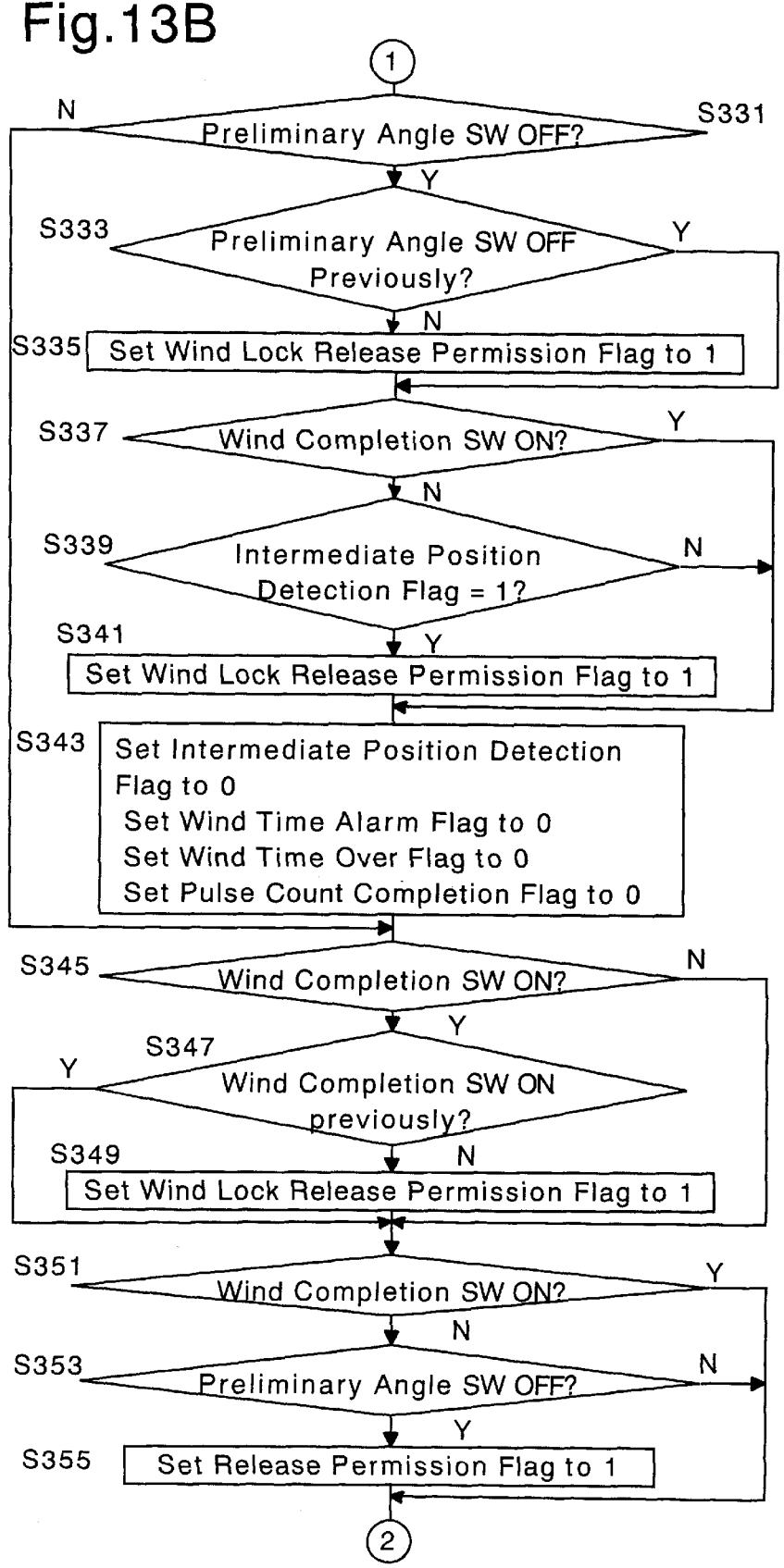
FIG. 13B is part of a flow chart of a body state checking operation in a single lens reflex camera in FIG. 1.
Figure 13C:
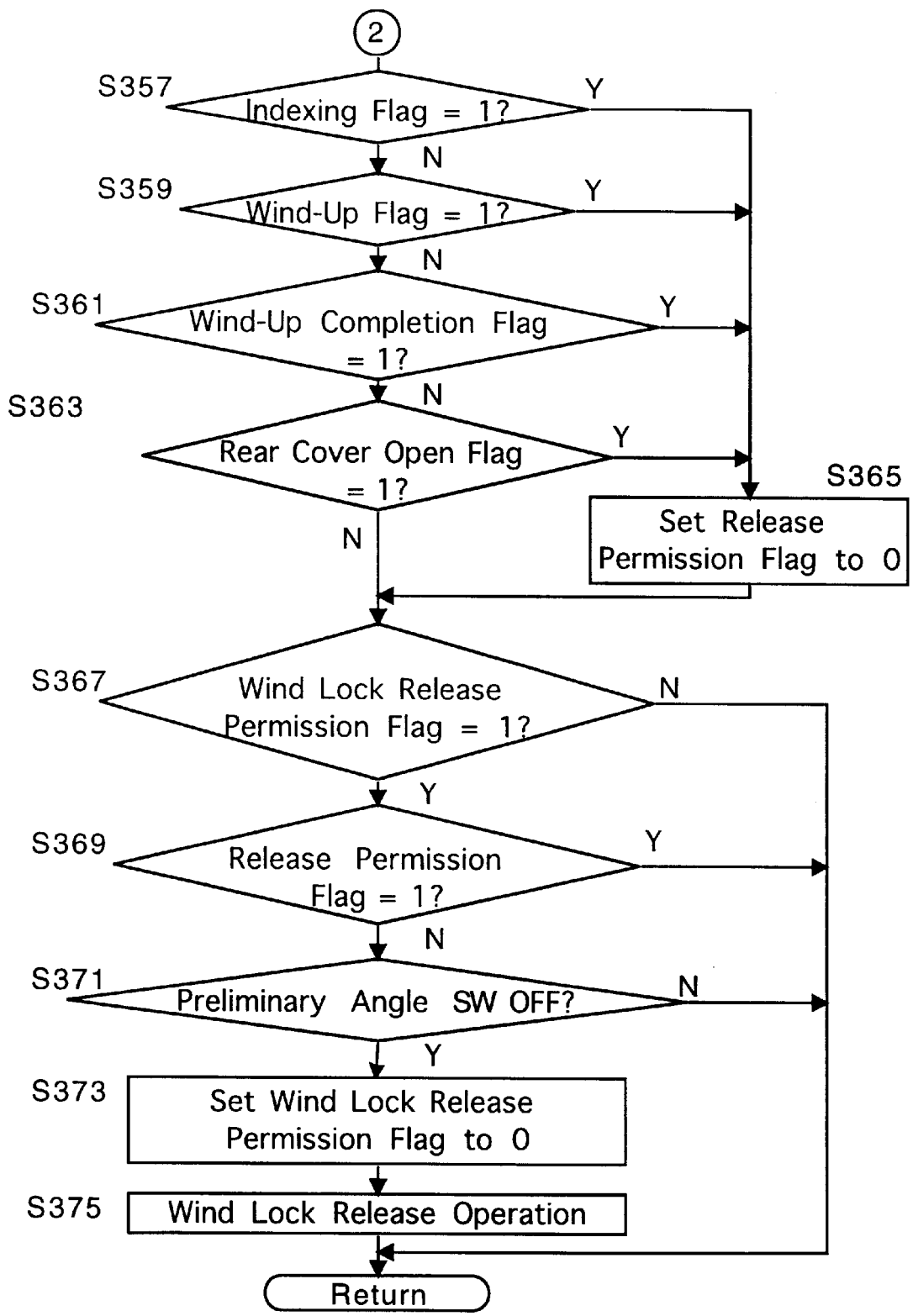
FIG. 13C is part of a flow chart of a body state checking operation in a single lens reflex camera in FIG. 1; is a flow chart of a body state checking operation in a single lens reflex camera in FIG. 1.

The body state checking operation which is carried out at steps S123 and S145 in the main routine will be discussed below with reference to flow chart shown in FIGS. 13A, 13B and 13C.

In the body state checking operation, whether or not the winding operation can be carried out by the wind lever 15 (whether or not the wind lock should be released) is judged based on the state of the preliminary angle switch 110, the wind completion switch SWE and the intermediate position detection flag. Moreover, whether or not the release is permitted is judged based on the state of the preliminary angle switch 110 and the wind completion switch SWE. Whether or not the release is prohibited is judged based on the state of the indexing flag, the wind-up flag, the wind-up completion flag, and the rear-cover-open flag.

In the body state checking operation, it is checked whether or not the rear cover switch is open (S301). If the rear cover is open, the film frame counter is set to 0 (S301, Y; S303). Subsequently, the rear cover closure first operation flag is set to 0, the body state flags are all set to 0, the rear-cover-open flag is set to 1 and the pulse count completion flag is set to 0 (S305, S307, S309, S311). Thereafter, control proceeds to step S321.

The body state flags include the indexing flag, the wind-up flag, the wind-up completion flag, and the wind flag.

If the rear cover switch is not open (S301, N), since the rear cover is closed, whether or not the rear cover has been previously open is checked (S313). If the rear cover has been open previously, since the rear cover which has been open is closed, all the body state flags are set to 0 (S315), the indexing flag is set to 1 (S317), and the rear cover closure first operation flag is set to 1 (S319) in order to carry out the indexing operation. Thereafter, control proceeds to step S321.

At step S321, it is checked whether or not the counted number of the film frame counter is the same as the final number of exposed frames. If the counted number is the final number of the exposed frames, whether the wind completion switch SWE is turned ON is checked (S321, Y; S323). If the wind completion switch SWE is turned ON, since the movement of the trailing curtain is completed, it is checked whether or not the intermediate position detection flag is set to 1 (S323, Y; S325). If the intermediate position detection flag is not set to 1, since the last frame has been exposed and the wind lever 15 has been returned to the preliminary angular motion range, the body state flags are all set to 0 (S325, N; S327). Thereafter, the wind-up flag is set to 1 and control proceeds to step S331 (S329).

At step S331, it is checked whether or not the preliminary angle switch 110 is OFF. If the preliminary angle switch 110 is OFF, since the wind lever 15 is within the preliminary angular motion range, it is checked whether or not the preliminary angle switch 110 has been OFF previously (S331, Y; S333). If the preliminary angle switch 110 has not been OFF previously, since the wind lever 15 has been returned from the wind end position, the wind lock release permission flag is set to 1 and control proceeds to step S337

(S333, N; S335). If the preliminary angle switch 110 has been OFF previously, control skips step S335 and proceeds to step S337 (S333, Y).

The wind lock release permission flag is set to 1 at step S335, which is used to set one of the conditions (1) through (5) for releasing the double wind prevention device 700 when the wind lever 15 is returned from the wind end position toward the preliminary angular motion range.

At step S337, it is checked whether or not the wind completion switch SWE is turned ON. If the wind completion switch SWE is not turned ON, since the trailing curtain has been moved from the movement completion position, it is checked whether or not the intermediate position detection flag is set to 1 (S337, N; S339). If "1" is set, since the film is being wound, the wind lock release permission flag is set to 1 and control proceeds to step S343 (S339, Y; S341).

One of the conditions of the wind lock release permission flag setting operation of step S341 in order to release the double wind prevention device 700 is when the wind lever 15 is within the preliminary angular motion range and when the trailing curtain is not located at the movement completion position while the film is being wound, i.e., during the indexing operation or during the film wind-up operation.

If the wind completion switch SWE is turned ON at step S337 (S337, Y), since the trailing curtain is located at the movement completion position, control skips steps S339 and S341 and proceeds to step S342. If the trailing curtain is not at the movement completion position and if the intermediate position flag is not set to 1, since the film is not being wound, control skips step S341 and proceeds to step S343 (S337, N; S339, Y).

At step S343, the intermediate position detection flag, the wind time alarm flag, the wind time over flag and the pulse count completion flag are set to 0. If the preliminary angle switch 110 is not OFF in the preliminary angle switch checking operation at step S331, since the wind lever 15 is not within the preliminary angular motion area, control skips steps S333 through S343 and proceeds to step S345 (S331, N).

Whether or not the wind completion switch SWE is turned ON is checked at step S345. If the wind completion switch SWE is ON, it is checked whether the wind completion switch was previously ON (S345, N; S347). If the wind completion switch SWE has not been previously turned ON, since the movement of the trailing curtain has been completed, the wind lock release permission flag is set to 1 at step S349, and control proceeds to step S351 (S347, N; S349). However, if the wind completion switch SWE has been turned ON, since the movement of the trailing curtain had been completed, control skips step S349 and proceeds to step S351 (S347, Y).

One of the conditions in order to release the double wind prevention device 700 is when, in step S349, the wind completion switch SWE is ON after the movement of the trailing curtain has been completed in the release operation.

At step S351, it is checked whether or not the wind completion switch SWE is turned ON. If the wind completion switch SWE is not ON, it is checked whether the preliminary angle switch 110 is turned OFF (S351, N; S353). If the preliminary angle switch 110 is OFF, since the trailing curtain has been charged, and the wind lever 15 is in the photographable position, the release permission flag is set to 1 and control proceeds to step S357 (S353, Y; S355). If the preliminary angle switch 110 is not OFF, since the trailing curtain is in the travel completion position or the film is being wound by the wind lever 15, control proceeds from step S353 to step S357 without setting the release permission flag (S353, Y; S357). Alternatively, if the wind completion switch SWE is ON, control skips steps S353 and S355, and proceeds to step S357.

At steps S357 through S363, it is checked whether the indexing flag, the wind-up flag, the wind-up completion flag, or the rear-cover-open flag is set to 1. If the indexing flag, the wind-up flag, the wind-up completion flag, or the rear-cover-open flag is set to 1, the releasing operation cannot be carried out; and hence, the release permission flag is set to 0, and control proceeds to step S367 (S357, Y; S359, Y; S361, Y; S363, Y; S365). If the indexing flag, the wind-up flag, the wind-up completion flag, and the rear-cover-open flag are all not set to 1 (S357, N; S359, N; S361, N; S363, N), since the releasing operation can be carried out, control skips step S365 and proceeds to step S367.

Whether or not the wind lock release permission flag is set to 1 is checked at step S367. If the wind lock release permission flag is set to 1, it is checked whether or not the release permission flag is set to 1 (S367, Y; S369). If the release permission flag is not set to 1, it is checked whether or not the preliminary angle switch 110 is turned OFF is checked (S369, N; S371). If the preliminary angle switch 110 is OFF, the wind lock release flag is set to 0 and since the release permission flag is not set to 1 and the wind lever 15 is in the preliminary angular motion range in which the film can be wound, the wind lock releasing operation is carried out so as to wind the film by the wind lever 15 (S371, Y; S373, S375). The wind lock releasing operation refers to an operation in which the wind lock releasing coil 703C is immediately energized to rotate the first and second lock levers 701 and 702 to the double wind prevention release position.

If the wind lock release permission flag is not set to 1 (S367, N), or if the release permission flag is set to 1 (S369, Y), or the preliminary angle switch 110 is not OFF (S371, N), since no winding by the wind lever 15 can be carried out, control skips steps S373 and S375 and is returned.

Figure 14:
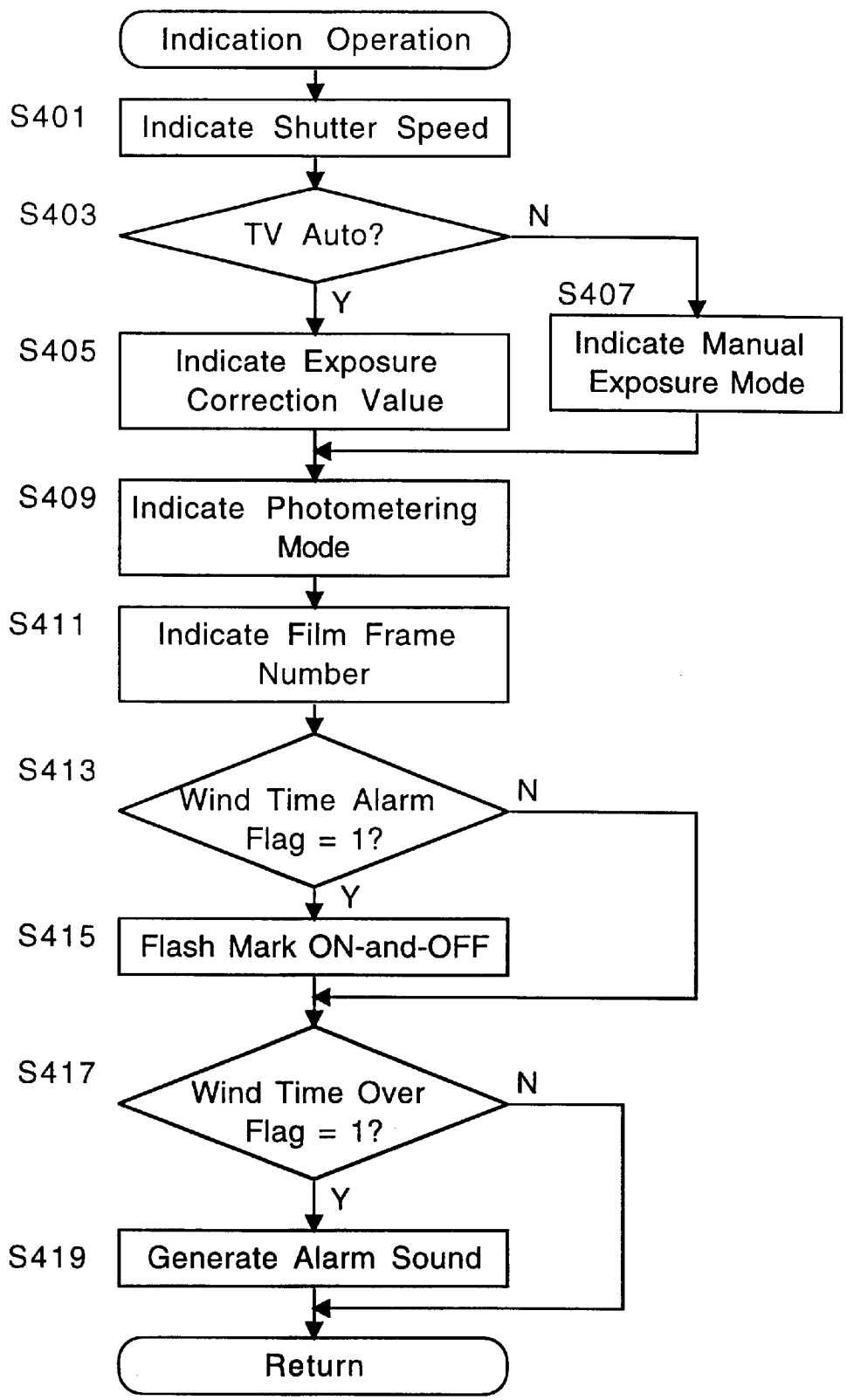
FIG. 14 is a flow chart of an indication operation in a single lens reflex camera shown in FIG. 1.

The indication operation at steps S125 and S147 in the main operation will be discussed below with reference to the flow chart shown in FIG. 14. In this operation, the photographing data such as shutter speed Tv, etc., is indicated in the internal LCD 65 of the finder, and the film feed state is indicated by the LCD 17 to alarm the user.

Figure 22A:
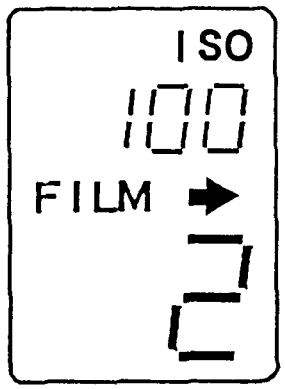
Figure 22B:
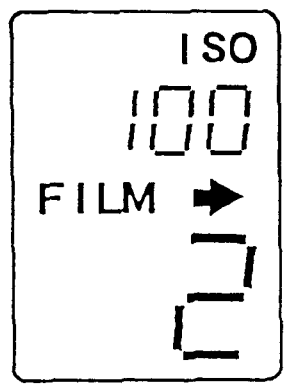
Figure 22C:
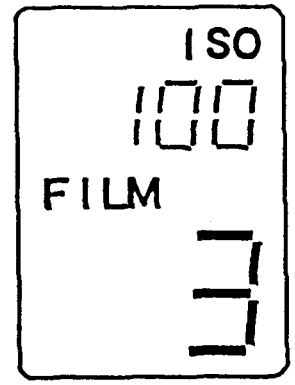

FIG. 22A shows an alarm indication which represents the film being wound when the release operation ends at the second frame (the counted number is 2), FIG. 22B shows an indication which represents the wind lever 15 released during the winding operation, and FIG. 22C shows an indication which represents the winding of the film from the second frame completed; by way of example.

In the indication operation, the set shutter speed Tv is indicated (S401). If the automatic shutter mode is set, the exposure correction value is indicated (S403, Y; S405), and if the manual shutter mode is selected, the value of the manual exposure meter is indicated (S403, N; S407). Subsequently, the photometering mode and the number of the exposed frames are indicated (S409, S411).

At step S413, it is checked whether or not the wind time alarm flag is set to 1. If the wind time alarm flag is set to 1, the film has not been wound for a predetermined time after the commencement of the winding operation by the rotation of the wind lever 15, and an arrow mark flashes ON-and-OFF to alert the user, and control proceeds to step S417 (S413, Y; S415). An example of the indication is shown in FIG. 22B. If the wind time alarm flag is not set to 1, control skips step S415 and proceeds to step S417 (S413, Y).

At step S417, it is checked whether or not the wind time over flag is set to 1. If the wind time over flag is set to 1, since the winding of the film is interrupted for a time longer than the predetermined time, an alarm sound is produced by the alarm device 70, and control is thereafter returned (S417, Y; S419). If the wind time over flag is not set to 1 (S417, N), since the time after the commencement of the winding operation has not reached the predetermined time-over time, control skips step S419 and is returned.

Figure 15:
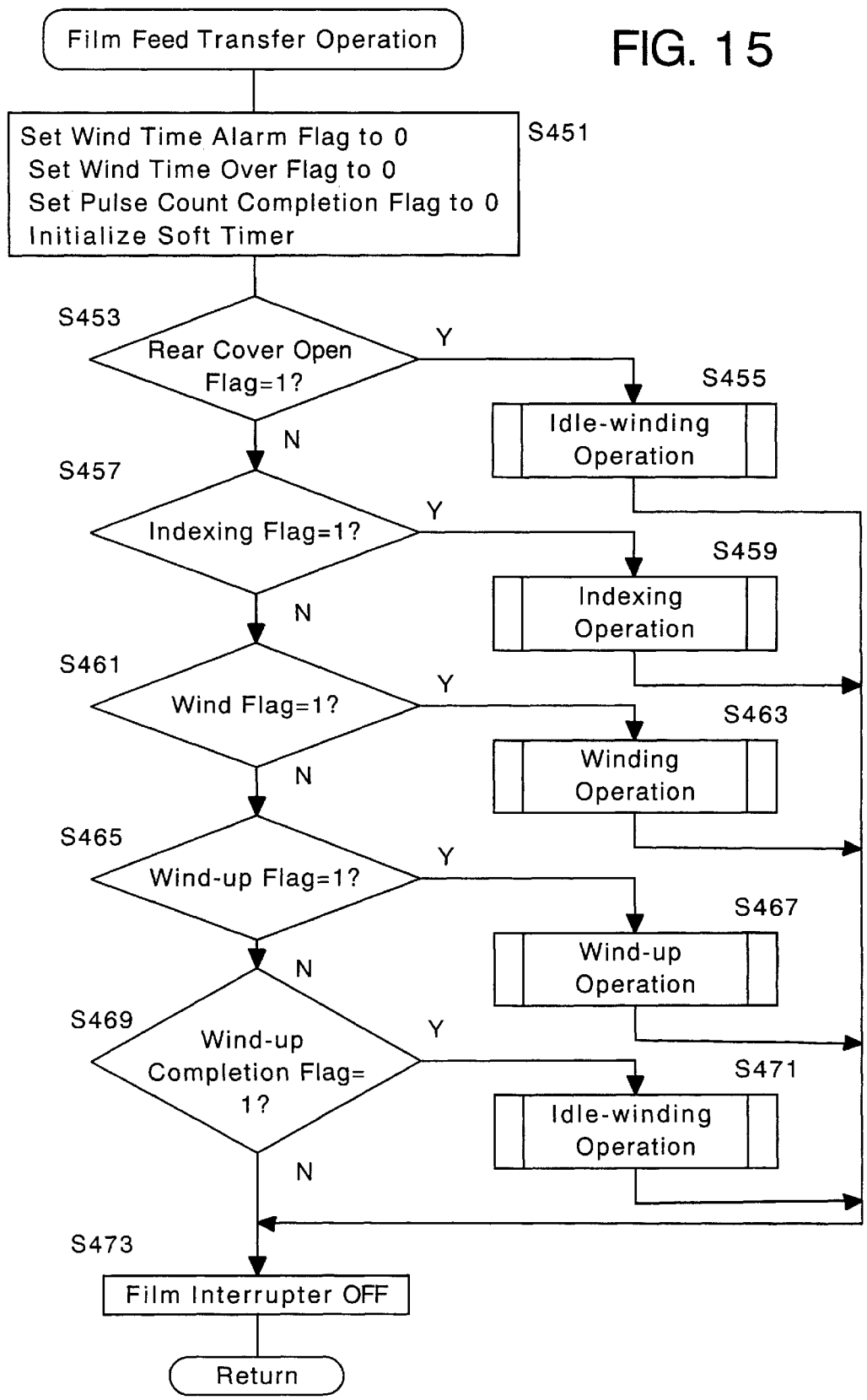
FIG. 15 is a flow chart of a film feed operation in a single lens reflex camera shown in FIG. 1.

The film feed operation which is carried out at steps S209 and S229 in the film feed transfer checking operation will be explained below with reference to a flow chart shown in FIG. 15. In this operation, the film is fed in accordance with the body state flag set in the body state checking operation.

When control enters the film feed operation, the wind alarm flag, the wind time over flag, the pulse count completion flag are set to 0 and a soft timer which counts the alarm time and the time-over time are initialized (S451). The soft timer refers to a timer which counts the period of time from the commencement of the rotation of the wind lever 15 beyond the wind start position in the winding direction, to the accommodation position. The alarm time is set to 1 in order to reduce the electric power consumption by turning the photo-interrupter 63 OFF if the wind lever 15 is not returned to the accommodation position even after the lapse of a first time from the commencement of the counting operation. Namely, if in this case it is assumed that the wind lever 15 has been released during the return movement and the lapse of the first time is indicated to alarm the user. The time-over time defines a second time longer than the alarm time. If the second time has lapsed, an alarm sound is produced to alert the user more assertively.

Whether or not the rear-cover-open flag, the indexing flag, the wind flag, the wind-up flag, or the wind-up completion flag is set to 1 is checked (S453, S457, S461, S465, S469). The rear-cover-open flag, the indexing flag, the and the wind-up flag are set to 1 at steps S309, S317, S329 in the body state checking operation, respectively. The wind flag is set to 1 at step S643 in the indexing operation which will be discussed hereinafter. The wind-up completion flag is set to 1 at step S845 in the wind-up operation which will be discussed hereinafter.

If the rear-cover-open flag is set to 1, the idle-winding operation is carried out (S453, Y; S455). If the indexing flag is set to 1, the indexing operation is carried out (S457, Y; S459). If the wind flag is set to 1, the winding operation is carried out (S465, Y; S467). If the wind-up flag is set to 1, the wind-up operation is carried out (S465, Y; S467). If the wind-up completion flag is set to 1, the idle-winding is carried out (S469, Y; S471). When control is returned from the sub-routine at each step, the photo-interrupter 63 is turned OFF and control is returned (S473).

If none of the flags are set to 1 (S453, N; S457, N; S461, N; S465, N; S469, N), since the film is not wound, the photo-interrupter 63 is turned OFF and control is returned (S473).

Figure 16:
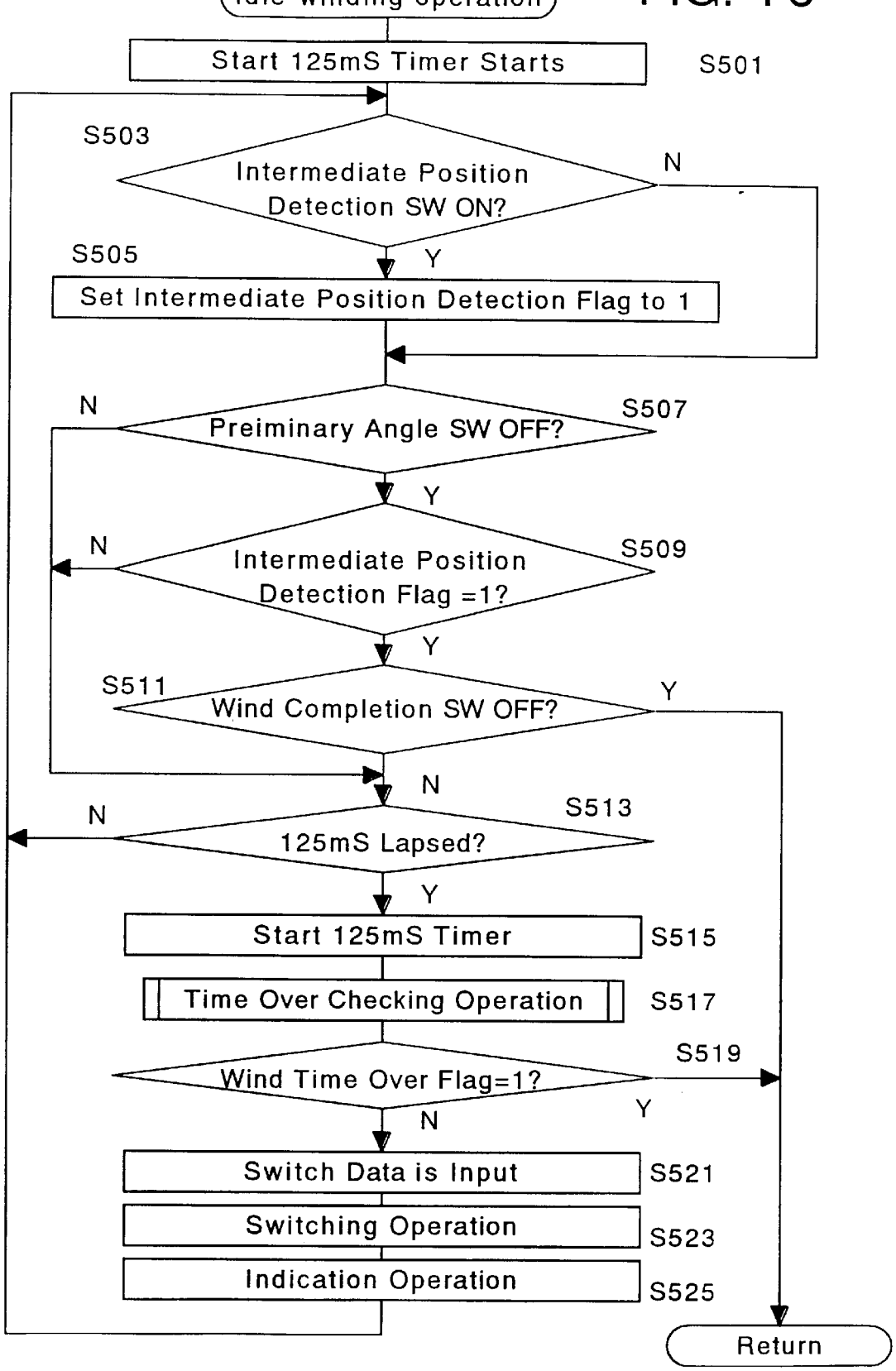
FIG. 16 is a flow chart of an idle-winding operation in a single lens reflex camera in FIG. 1.

The idle-winding operation at steps S455 and S471 will be described below with reference to a flow chart shown in FIG. 16 and the timing chart shown in FIG. 7. The idle-winding operation is carried out when the rear cover is opened, or when the film winding is completed after the last frame of the predetermined number of frames of the film has been exposed. In this operation, the wind lever 15 is rotated from the wind start position to the wind end position and is returned to the preliminary angular motion range beyond the wind start position, and the wind lock releasing coil 703C is instantly supplied with electricity to release the double wind prevention device 700 so as to wind the film.

In the idle-winding operation, the photo-interrupter 63 is not turned ON since it is not necessary to detect the amount of the feed of the film.

In the idle-winding operation, the 125 mS timer is started (S501). The 125 mS timer is a hard timer which is adapted to set the interval at which the time-over checking operation, the switch input operation, the indication operation, etc., are repeated. Thereafter, it is checked whether or not the intermediate position detection switch 115 is turned ON (S503). If the intermediate position detection switch is turned ON, the intermediate position detection flag is set to 1 and control proceeds to step S507 (S503, Y; S505). If the intermediate position detection switch is not ON, control skips step S505 and proceeds to step S507 (S503, N).

At step S507, it is checked whether or not the preliminary angle switch 110 is turned OFF. If the preliminary angle switch is OFF, since the wind lever 15 is within the preliminary angular motion range, it is checked whether or not the intermediate position detection flag is set to 1 (S507, Y; S509). If the intermediate position detection flag is set to 1, since the wind lever 15 is rotated, whether or not the wind completion switch SWE is turned OFF is checked (S509, Y; S511). If the wind completion switch SWE is OFF, the trailing curtain is not at the travel completion position, therefore control returns (S511, Y).

If the preliminary angle switch 119 is not OFF (S507, N), the intermediate position detection flag is not set to 1 (S509, N), or if the wind completion switch SWE is not OFF (S511, N), control proceeds to step S513, since the wind lever 15 is in an intermediate position of the winding operation, or the winding by the wind lever 15 is not commenced, or the trailing curtain is at the travel completion position.

At step S513 it is checked whether 125 mS have lapsed. If 125 mS have not lapsed, control is returned to step S503 to repeat the operation beginning at step S503 and those subsequent thereto (S513, N). If 125 mS have lapsed, the 125 mS timer restarts (S513, Y; S515) to perform the time-over checking operation (S517). If the wind time over flag is set to 1, control is returned (S519, Y), and if the wind time over flag is not set to 1 (S519, N), the switch state is input (S521) to perform the switching operation (S523) or the indication operation (S525) in accordance with the input switch state. Thereafter, control is returned to step S503.

In the idle-winding operation mentioned above, the film can be fed in the winding direction by repeating the winding rotations of the wind lever 15. The idle-winding operations are repeated until the rear cover is closed. The idle-winding operation is used, for example, when the film is loaded after the rear cover is open; the leading end of the leader portion of the film is inserted in the slit of the take-up spool; the film is wound onto the spool until the start line printed on the leader portion of the film is registered with the film start mark indicated in the vicinity of the aperture; or after the film is completely wound following the exposure of the last frame.

Figure 17:
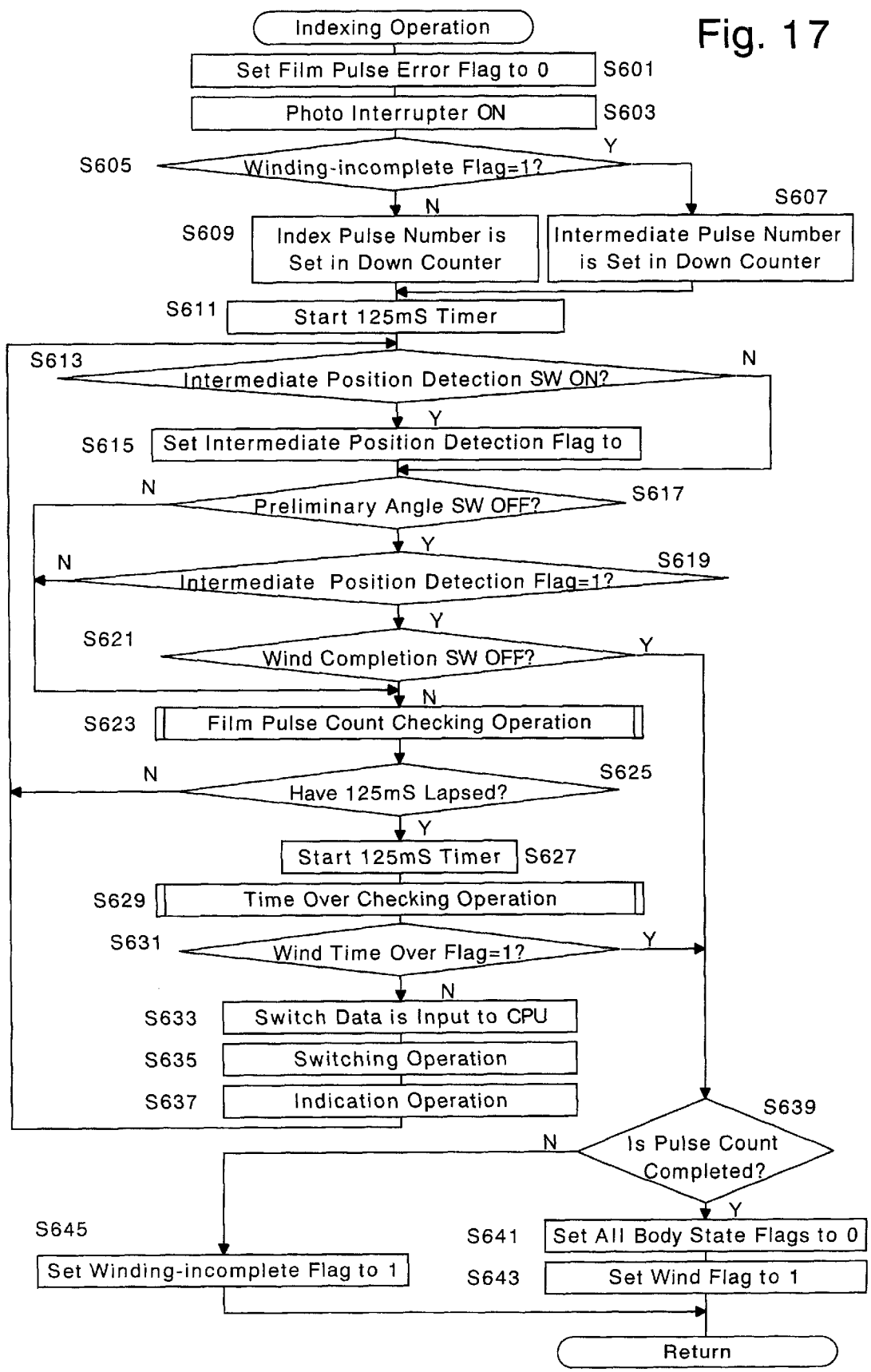
FIG. 17 is a flow chart of a first frame indexing operation in a single lens reflex camera shown in FIG. 1.

The indexing operation performed at step S459 will be discussed below, referring to a timing chart shown in FIG. 7 and a flow chart shown in FIG. 17. In general, the indexing operation begins when the rear cover is closed after the film is loaded and the start line of the leader portion of the film is registered with the film start mark. In the indexing operation, the film can be fed by several rotations of the wind lever 15 until a frame immediately before the first frame of the film is located in the aperture of the camera body.

When the indexing operation begins, the film pulse error flag is set to 0 and the photo-interrupter 63 is turned ON so that the film pulses can be counted (S601, S603).

Whether or not the winding-incomplete flag is set to 1 is checked (S605). If the winding-incomplete flag is set to 1, since the film is being wound, the intermediate pulse number is set in the down counter (decrement counter) (S605, Y; S607). If the winding-incomplete flag is not set to 1, since no winding has started, the index pulse number is set in the down counter (S605, N; S609). Thereafter, the 125 mS timer starts (S611).

Thereafter, whether or not the intermediate position switch 115 is turned ON is checked. If the switch is ON, the intermediate position detection flag is set to 1 and control proceeds to step S617 (S613, Y; S615). If the switch is not turned ON, control proceeds to step S617 without setting the flag (S613, N). Whether or not the preliminary angle switch 110 is OFF is checked at step S617. If the preliminary angle switch is OFF, it is checked whether the intermediate position detection flag is set to 1 (S617, Y; S619). If the intermediate position detection flag is set to 1, whether or not the wind completion switch SWE is OFF is checked (S619, Y; S621). If the wind completion switch SWE is OFF, since the charging operation is completed and the wind lever 15 is returned to the preliminary angular motion range, control skips to step S639 (S621, Y).

If the preliminary angle switch 110 is not OFF (S617, N), the intermediate position detection flag is not set to 1 (S619, N), or if the wind completion switch SWE is not OFF (S621, N); either a winding operation via the wind lever 15 has not begun, the wind lever 15 is located in an intermediate angular position of the winding operation, or the trailing curtain is in the movement completion position; and hence control proceeds to step S623.

At step S623, the operation for checking film pulses output from the photo-interrupter 63 is carried out. Thereafter, whether or not 125 mS have lapsed is checked (S625). If 125 mS have not lapsed, control is returned to step S613 to repeat the operations mentioned above.

If 125 mS have lapsed at step S625, the 125 mS timer is restarted (S627), and the time-over checking operation is carried out (S629). Thereafter, it is checked whether or not the wind time over flag is set to 1 (S631). If the wind time over flag is set to 1, since no rotation of the wind lever takes place for a predetermined time, one minute for example, control proceeds to step S639 to check whether or not the pulse counting operation is completed (i.e., pulse count completion flag=1). If the pulse counting operating is completed, the body state flags are all set to 0 (S639, Y; S641) and the wind flag is set to 1. Thereafter, control is returned (S643).

If the wind time over flag is not set to 1, the switch states are input (S631, N; S633) and the operations corresponding to the input switch states are carried out (S635). Also, the indication operation during the indexing operation in the external LCD 17 is carried out and control is returned to step S613 (S637).

If the wind time over flag is set to 1 and if the pulse counting has not been completed, namely, if the wind lever 15 is released during the rotation, the winding-incomplete flag is set to 1 (S645) wherein the indexing flag has been set to 1, and the intermediate pulse number is written in the EEPROM 59. Thereafter, control is returned to the film feed operation and the photo-interrupter 63 is turned OFF at step S473 of the film feed operation.

In the film feed transfer checking operation, control proceeds to steps S211 and S213. Therefore, while the intermediate position detection switch 115 is not ON, control skips the film feed operation at step S229, and hence control waits for the intermediate position detection switch 115 to turn ON while the photo-interrupter 63 is OFF. If the intermediate position detection switch 115 is turned ON by the rotation of the wind lever 15, control proceeds to steps S215 and S217 from step S213 to set the winding-imcomplete flag to 1, set the wind time alarm flag to 0 and set the wind time over flag to 0, so as to carry out the film feed operation at step S229. In the film feed operation, control is returned from step S457 to step S459, i.e., to the indexing operation. The photo-interrupter 63 is turned ON at step S603, and control proceeds from step S605 to step S607 to set the intermediate pulse number written in the EEPROM 59 in the down counter and continue the indexing operation.

Consequently, if the wind lever 15 is released during the winding operation, the photo-interrupter 63 is turned OFF to save the power and if the wind lever 15 is rotated in the winding direction again, the photo-interrupter 63 is turned ON to continue the winding operation. Thus, the film can be precisely fed by the amount necessary to index the first frame of the film.

Figure 18:
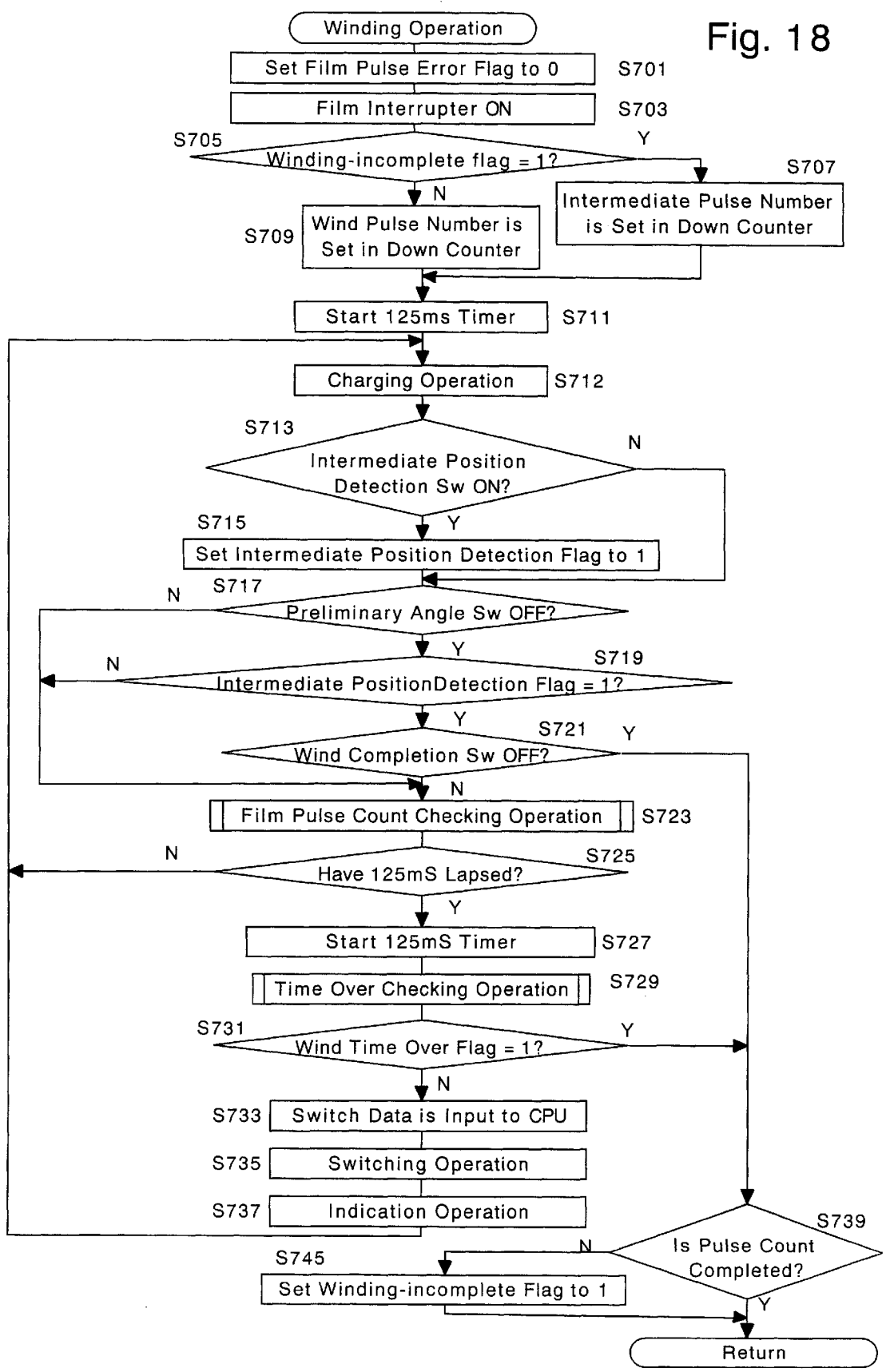
FIG. 18 is a flow chart of a film winding operation in a single lens reflex camera shown in FIG. 1.

The winding operation will be discussed below with reference to a flow chart shown in FIG. 18 and a timing chart shown in FIG. 8.

In the winding operation, the film is wound by one frame and the shutter is charged. In this operation, the double wind prevention device 700 which operates when the wind lever 15 is returned from the wind end position to the preliminary angular motion range is not released. The release of the double wind prevention device 700 is carried out when the release switch SWR is turned ON after the film winding and the shutter charging are completed, and when the wind completion switch SWE is turned ON after the movement of the trailing curtain is completed.

Note that since the operations at steps S701 through S745 includes those common to steps S601 through S645 of the indexing operation, differences therebetween only will be explained below.

In the indexing operation, the index pulse number necessary to index the first frame is set in the down counter when the winding-incomplete flag is not set to 1 at step S605. In the winding operation, if the winding-incomplete flag is not set to 1 at step S705, the wind pulse number necessary to wind the film by one frame is set in the down counter (S705, N; S709).

If the winding-incomplete flag is set to 1, since the winding rotation is suspended during the winding operation, the intermediate pulse number written in the EEPROM 59 is set in the down counter (S705, Y; S707). After the 125 mS timer starts, the charging motor 81 is driven to charge the shutter and the mirror mechanism (S711, S712). Although no detail of the charging operation is given herein, the leading and trailing curtains of the shutter are moved to the exposure stand-by position by the charging motor 81; the drive springs therefor are charged; the main mirror is rotated to the upward position (photographing position); and the drive spring for moving the mirror downward is charged.

In the indexing operation, if the pulse counting ends, control proceeds from step S639 (Y) to step S641 to set all the body state flags to 0, and the wind flag is set to 1 in order to enter the winding operation (S643). However, in the winding operation, control is returned when the pulse counting ends (S739, Y).

If the wind lever is released during the winding operation, since control proceeds from step S731 to step S739, control is returned from step S739 (N) to the film feed operation through step S745. In this operation, similar to the indexing operation, the film wind-up flag is set to 1, and the intermediate pulse number is written in the EEPROM 59 (S745) and control is returned to the film feed operation while the wind flag remains set at 1. Consequently, if the wind lever 15 is rotated to wind the film and the intermediate position detection switch 115 is turned ON, control enters the film feed operation at step S229 via steps S211, S213, S215, S217 in the film feed transfer checking operation. Thereafter, control is returned to the winding operation at step S463 from step S461 (Y) in the film feed operation. The photo-interrupter 63 is turned ON at step S703, and control enters step S707 from step S705 (Y) where the intermediate pulse number written in the EEPROM 59 is set in the down counter to continue the winding operation.

If the wind lever 15 is released during the winding operation, the photo-interrupter 63 is turned OFF to save the energy (electricity). If the wind lever 15 is rotated again to wind the film, the photo-interrupter 63 is turned ON to continue the winding operation, so that the film can be precisely fed by one frame.

Figure 19:
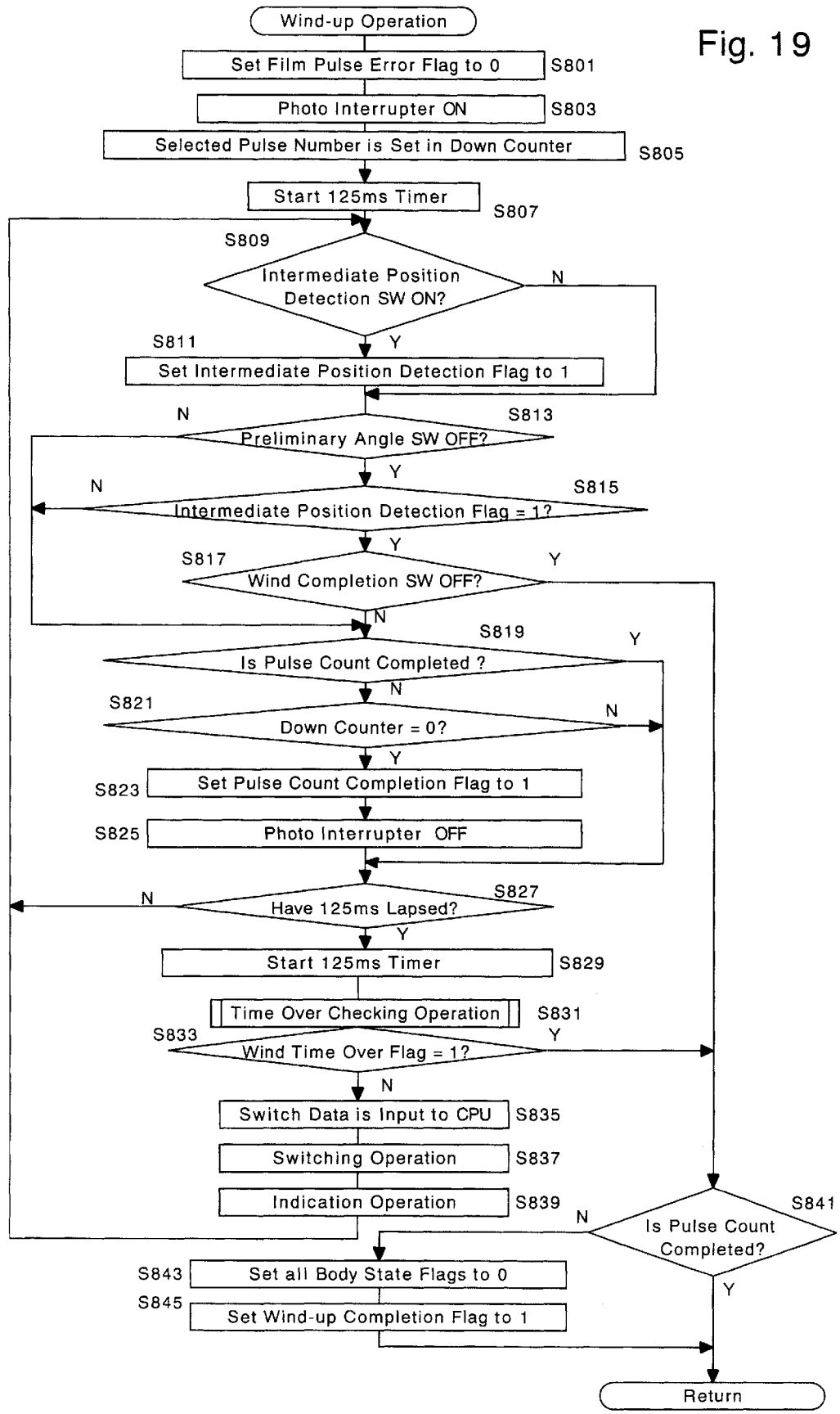
FIG. 19 is a flow chart of a film wind-up operation in a single lens reflex camera in FIG. 1.

The wind-up operation will be discussed below with reference to a flow chart shown in FIG. 19 and timing charts shown in FIGS. 9 and 10. The wind-up operation refers to an operation in which the film is wound up onto the spool after the last frame of a predetermined number of frames is exposed (the movement of the trailing curtain is completed). Since the wind-up operation includes those common to steps S611 through S627 in the indexing operation, differences therebetween will be only discussed.

In the wind-up operation, the film pulse error flag is set to 0 (S801), the photo-interrupter 63 is turned ON (S803), and a selected pulse number necessary to detect the presence of the film is set in the down counter (S805). The selected pulse number is smaller than the pulse number necessary to wind the film by one frame.

Thereafter, the 125 mS timer starts (S807) and control waits for the winding-up of the film while carrying out the pulse counting operation (steps S809 through S839). In this operation, if the value of the down counter is 0 before the pulse count completion flag is set to 1 (S819, N; S821, Y), namely, if the number of the pulses output from the photo-interrupter 63 is identical to the selected pulse number, the pulse count completion flag is set to 1, and the photo-interrupter 63 is turned OFF (S823, S825). Thus, the electric power consumption can be reduced.

If it is detected that the wind completion switch SWE is turned OFF when the preliminary angle switch 110 is OFF and the intermediate position detection flag is set to 1 (S817, Y), or if it is detected that the wind time over flag is set to 1, control proceeds to the pulse count completion operation at step S841.

In the pulse count completion checking operation, if the pulse counting operation is completed, control is returned (S841, Y). If the pulse counting operation is not completed (S841, N), it is judged that no film is loaded (i.e., that the film winding is completed), the body state flags are all set to 0 (S843), the wind-up completion flag is set to 1, and control is returned (S845). Since the wind-up completion flag is set to 1 when the pulse counting operation is not completed and control is thereafter returned, it is possible to perform the idle-winding of the film when the photo-interrupter 63 is turned OFF in the film idle-winding operation (S471) into which control enters at step S469 in the film feed operation.

If the wind time over flag is set to 1 in the time over checking operation at step S831, the film feed operation does not begin before the intermediate position detection switch 115 is turned ON, by the wind lever 15 being rotated to wind the film, in the film transfer checking operation. If control enters the film feed operation, control proceeds to the idle-winding operation at step S469.

Figure 20:
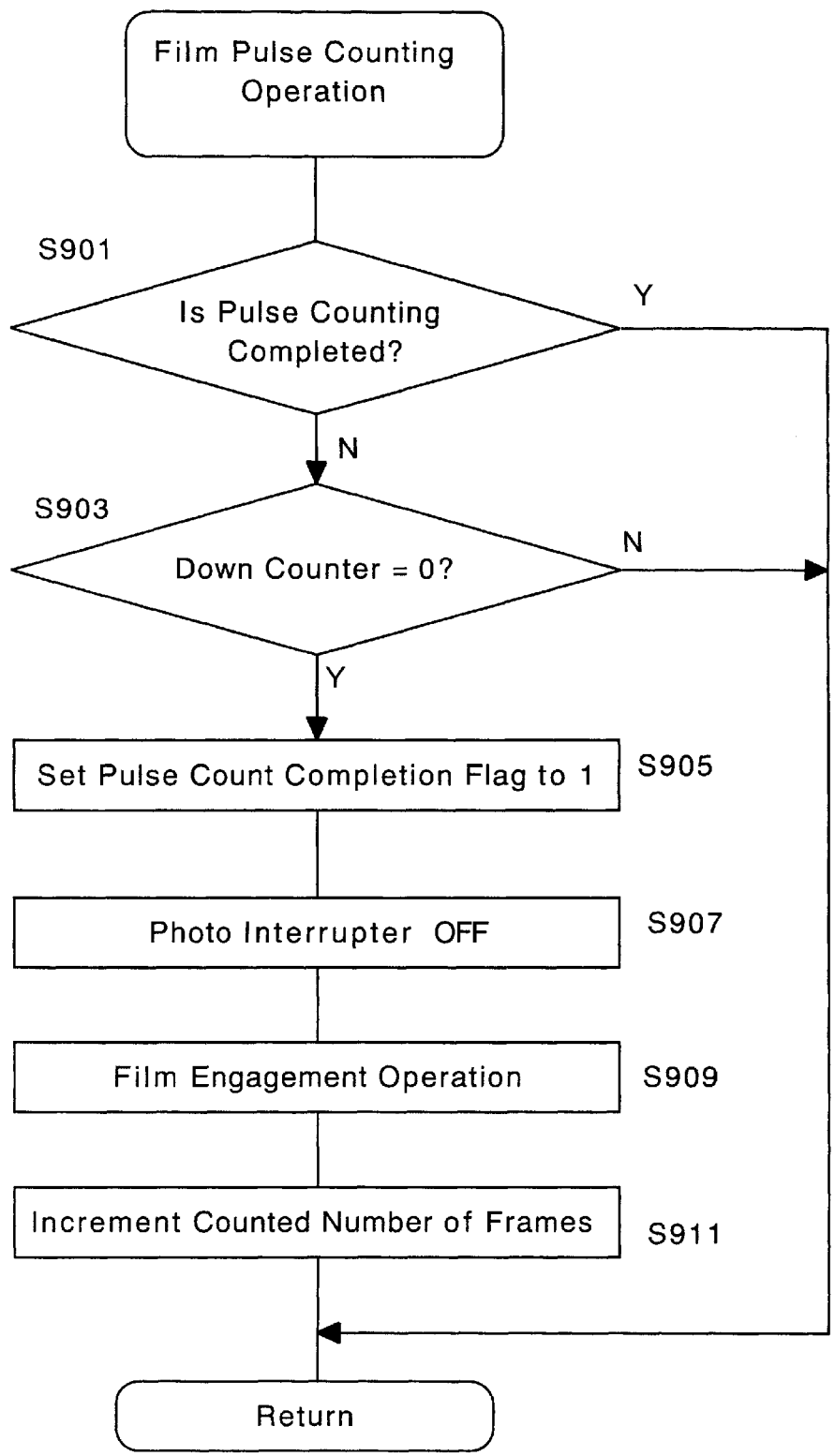
FIG. 20 is a flow chart of a pulse count checking operation in a single lens reflex camera shown in FIG. 1.

The pulse counting operation will be discussed below with reference to a flow chart shown in FIG. 20. In the pulse counting operation, the pulses output from the photo-interrupter 63 are counted, and if the counted number of the pulses is the same as a predetermined number, i.e., if a predetermined amount of film is wound, the one-way clutch 304A is disconnected to disconnect the wind lever 15 from the wind spool to thereby stop the feed of the film, so that no further feeding of the film occurs. If the wind lever 15 is returned to the preliminary angular motion range, the double wind prevention device 700 locks the wind lever so as not to rotate from the wind start position in the winding direction.

In the film engagement operation in the embodiment of the present invention, the film engaging coil 604C of the film wind stop device 600 is supplied with electricity when the value of the down counter is 0, so that the spool ratchet wheel 307 is engaged by the engagement lever 602 and the one-way clutch 304A is disconnected. Consequently, winding of the film does not take place even if the wind lever 15 is rotated.

In the pulse counting operation, it is checked whether or not the pulse counting is completed (S901). If the pulse counting operation is completed (S901, Y) or if the value of the down counter is not 0 (S903, N), control is returned.

If the pulse counting is not completed, it is checked whether or not the value of the down counter is 0 (S901, N; S903). If the value of the down counter is 0 (S903, Y), the pulse count completion flag is set to 1 (S905), the photo-interrupter 63 is turned OFF, the film engagement operation is carried out, the frame number count-up operation is carried out; and control is returned (S911).

Figure 21:
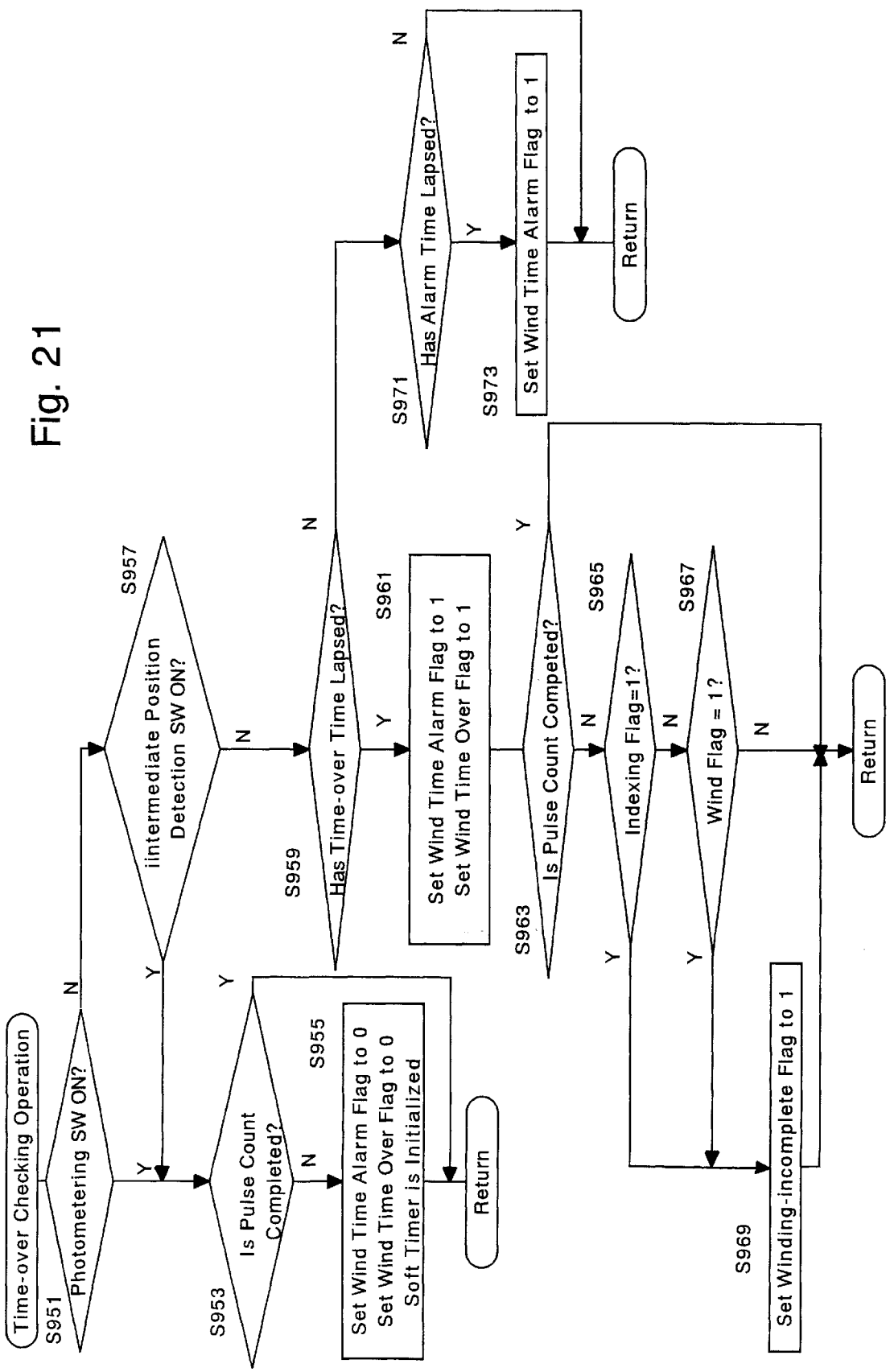
FIG. 21 is a flow chart of a time-over checking operation in a single lens reflex camera shown in FIG. 1; and, FIGS. 22A, 22B and 22C are explanatory views of different indications in a single lens reflex camera shown in FIG. 1.

The time over checking operation will be explained below with reference to a flow chart shown in FIG. 21. In the time over checking operation, if the film winding is not completed within a predetermined period of time, the user is alerted or the operation is interrupted.

In the time over checking operation, it is checked whether or not the photometering switch SWS is ON (S951). If the photometering switch is ON, whether or not the pulse counting operation is completed is checked (S951, Y; S953). If the pulse counting operation is completed, control is returned. If the pulse counting is not completed, the wind time alarm flag is set to 0, the wind time over flag is set to 0, the soft timer is initialized, and control is returned (S953, N; S955).

If the photometering switch SWS is not ON, it is checked whether or not the intermediate position detection switch 115 is ON (S957). If the detection switch 115 is ON, control is returned to step S953 (S957, Y).

If the intermediate position detection switch 115 is not ON (S957, N), since the wind lever 15 is not rotated to wind the film, it is checked whether or not the time-over time has lapsed (S959). If the time-over time has lapsed, the wind time alarm flag is set to 1 and the wind time over flag is set to 1 (S959, Y; S961). Thereafter, whether or not the pulse counting is completed is checked (S963). If the pulse counting is completed, control is returned (S963, Y). If the pulse counting is not completed (S963, N), it is checked whether or not the indexing flag is set to 1, and whether or not the wind flag is set to 1 is checked (S965, S967). If the indexing flag is set to 1 or the wind flag is set to 1 , since the film is being wound, the intermediate position detection flag is set to 1 and control is returned (S965, Y; S969) or (S967, Y; S969). Conversely, if the indexing flag is not set to 1 and the wind flag is not set to 1, control is returned (S965, N; S967, N).

If the time-over time has not lapsed (S959, N), it is checked whether or not the alarm time has lapsed (S971). If the alarm time has lapsed, the wind time alarm flag is set to 1 and control is returned (S971, Y; S973). If the alarm time has not lapsed, control skips step S973 and is returned (S971, N).

In the above-mentioned time over checking operation, if the film is being wound, the wind alarm time flag is set to 1, and hence the arrow mark of the LCD 17 is flashed ON-and-OFF, so that the user can be alerted. If the film winding is not completed within a predetermined time, the wind time over flag is set to 1. Consequently, the alarm device 70 issues an alarm sound at a predetermined time interval, so that the user can be alerted.

If the photometering switch SWS is turned ON during the film winding operation, the user holding the camera can recognize that the film is being wound, and hence the wind time alarm flag and the wind time over flag are set to 0, so that the arrow mark in the external LCD 17 is continuously lit, and the alarm sound is extinguished. Thus, control returns to the winding operation. If the intermediate position detection switch 115 is turned ON by the operation of the wind lever 15, the alarm sound is stopped, and control returns to the normal winding operation.

Although the above-mentioned discussion has been addressed to a single lens reflex camera using a Brownie film, the present invention can be generally applied to a camera having a manual winding mechanism.

Moreover, the rotation detection device to detect the rotation of the wind lever 15 includes the intermediate position detection switch 115 which is turned ON or OFF by the pawl; however, the rotation detection device is not limited thereto. For instance, an encoder (a combination of a code plate and a brush) which detects an absolute angular displacement of the ratchet wheel 201 can be utilized.

As can be understood from the above description, if the winding operation device is stopped during the winding operation, the power supply to the photo-interrupter is interrupted after the lapse of a predetermined time. If the rotation of the winding operation device is detected thereafter by the rotation detection device, the photo-interrupter is supplied with electricity, so that the film feed amount detection device continues the counting operation. Thus, if the winding operation device is released during the winding operation, the power consumption is reduced. When the winding operation of the winding operation device re-starts, the winding operation is detected by the rotation detection device, so that the electric power is supplied to the photo-interrupter. Consequently, the film feed amount detection device continues the counting operation, and thus, the film feed amount can be detected equally reliably as in the case of continuous rotation of the winding operation device. Namely, the film can be fed by a constant amount.

Moreover, in the preferred embodiments of the present invention, when the winding operation device is released for a predetermined time during the winding operation, the user is alerted by the indication device or the acoustic alarm device, and hence the user can easily recognize that the film is being wound.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A camera having a manual film winding apparatus in which a film is wound in association with a rotation of a winding operation device from a wind start position to a wind end position, comprising:

an encoder which rotates in association with the movement of the film which is wound by the rotation of said winding operation device and generates a signal each time said winding operation device is rotated by a predetermined angle;

a film feed amount detection device which counts output of the encoder to detect the feed amount of the film;

a rotation detection device for detecting the rotation of said winding operation device; and a controller which interrupts said encoder by turning said encoder OFF after the lapse of a predetermined time when said winding operation device is stopped during the winding operation, wherein said controller turns said encoder ON when said rotation detection device detects rotation of said winding operation device thereafter, so that the film feed amount detection device continues the counting operation.

2. A camera according to claim 1, wherein said encoder comprises a photo-interrupter.

3. A camera according to claim 1, further comprising an indication device, wherein said controller causes said indication device to indicate a warning indication after the lapse of the predetermined time.

4. A camera according to claim 1, further comprising an acoustic alarm device, wherein said controller causes said acoustic alarm device to generate an alarm sound after the lapse of the predetermined time.

5. A camera according to claim 3, wherein said controller actuates said indication device in different modes depending on the lapse time from the stoppage of said winding operation device.

6. A camera according to claim 4, wherein said controller actuates said acoustic alarm device in different modes depending on the lapse time from the stoppage of said winding operation device.

7. A camera according to claim 1, further comprising an indication device and an acoustic alarm device, wherein said controller causes said indication device to indicate a warning indication after the lapse of a first predetermined time, and causes said acoustic alarm device to generate an alarm sound after the lapse of a second predetermined time longer than the first predetermined time.

8. A camera according to claim 2, wherein said photo-interrupter comprises a roller which comes into contact with said film and rotates in association with the feed of said film, and a encoder plate which is rotated in association with said roller, said encoder plate being adapted to generate a signal each time said encoder plate rotates by a predetermined angle, so that the signals can be counted by said film feed amount detection device.

9. A camera according to claim 1, wherein said winding operation device comprises a wind lever which can be rotated from said wind start position to said wind end position; and a spool which rotates in association with the rotation of said wind lever from said wind start position to said wind end position, wherein said film is wound via said rotation of said spool.

10. A camera according to claim 9, further comprising a ratchet mechanism which stops stepwise the reverse rotation of said wind lever toward said wind start position during the rotation of said winding operation device from said wind start position toward said wind end position; wherein said rotation detection device is comprised of an intermediate position detection switch which detects when said winding operation device has moved from an engagement position with the ratchet mechanism to another engagement position.

11. A camera according to claim 10, wherein said controller detects the amount of film that is wound via an output of a photo-interrupter having a roller which comes into contact with said film and is rotated in association with said movement of said film and an encoder plate which is rotated in association with said roller;

wherein said camera comprises a friction clutch which connects or disconnects said wind lever to, or from, said spool; and a film wind stop device which stops said rotation of said spool when said film feed amount detector detects that a predetermined amount of film is wound, wherein said friction clutch disconnects said wind lever from said spool so that said wind lever can be rotated to said wind end position without winding said film any further.

12. A camera according to claim 11, further comprising a preliminary angle switch; wherein when said preliminary angle switch detects that said wind lever has been rotated past a preliminary angle toward said wind end position, said controller supplying electric power to said encoder; wherein when said wind lever has been rotated past said wind start position and before reaching said wind end position, said controller interrupts said encoder by turning said encoder OFF after the lapse of a predetermined time.

13. A camera according to claim 3, wherein said controller stops said indication warning of said indication device when the rotation detection device detects rotation of said winding operation device during said indication warning.

14. A camera according to claim 4, wherein said controller stops said alarm sound of said acoustic alarm device when the rotation detection device detects rotation of said winding operation device during said alarm sound.

* * * * *